US012246552B2

(12) United States Patent
Smith

(10) Patent No.: US 12,246,552 B2
(45) Date of Patent: Mar. 11, 2025

(54) BOUND COLLECTION OF LEAVES FEATURING REGION OF REDUCED CUMULATIVE LEAF THICKNESS

(71) Applicant: Mark Smith, Dewey, AZ (US)

(72) Inventor: Mark Smith, Dewey, AZ (US)

( * ) Notice: Subject to any disclaimer, the term of this patent is extended or adjusted under 35 U.S.C. 154(b) by 0 days.

(21) Appl. No.: 17/997,518

(22) PCT Filed: May 10, 2021

(86) PCT No.: PCT/US2021/031555
§ 371 (c)(1),
(2) Date: Oct. 28, 2022

(87) PCT Pub. No.: WO2021/226579
PCT Pub. Date: Nov. 11, 2021

(65) Prior Publication Data

US 2023/0173838 A1 Jun. 8, 2023

Related U.S. Application Data

(60) Provisional application No. 63/103,994, filed on Sep. 8, 2020, provisional application No. 63/101,609, filed on May 8, 2020.

(51) Int. Cl.
*B42C 19/02* (2006.01)
*B42B 5/10* (2006.01)
(Continued)

(52) U.S. Cl.
CPC ................ *B42C 19/02* (2013.01); *B42B 5/10* (2013.01); *B42B 5/12* (2013.01); *B42D 1/001* (2013.01); *B42D 1/002* (2013.01)

(58) Field of Classification Search
CPC ................................ B42C 19/02; B42D 1/002
See application file for complete search history.

(56) References Cited

U.S. PATENT DOCUMENTS 1,962,407 A 6/1934 Pierce
2,230,634 A 2/1941 Williams
(Continued)

FOREIGN PATENT DOCUMENTS

DE 1461374 A1 12/1968
DE 102009010821 A1 9/2010
(Continued)

OTHER PUBLICATIONS

KR20190104479A English Translation (Year: 2019).*
(Continued)

*Primary Examiner* — Kyle R Grabowski
(74) *Attorney, Agent, or Firm* — Alleman Hall & Tuttle LLP

(57) ABSTRACT

A bound collection of leaves having a spine and a method of its manufacture are disclosed. Each leaf of a first plurality of leaves of the bound collection includes a first pattern of tabs by which that leaf is bound. The tabs of the first pattern are distributed along a binding axis of that leaf that is parallel to a spine axis of the spine. Each leaf of a second plurality of leaves of the bound collection includes a second pattern of tabs different than the first pattern by which that leaf is bound. The tabs of the second pattern are distributed along a binding axis of that leaf that is parallel to the spine axis. Each tab of the first pattern and second pattern of tabs extends in a direction orthogonal to the binding axis from within an unbound region to a binding-side edge of that leaf.

16 Claims, 17 Drawing Sheets

(51) Int. Cl.
*B42B 5/12* (2006.01)
*B42D 1/00* (2006.01)

(56) References Cited

U.S. PATENT DOCUMENTS

| | | | | |
|---|---|---|---|---|
| 2,646,726 | A | 7/1953 | Fogg | |
| D218,283 | S | 8/1970 | Kline | |
| D264,878 | S | 6/1982 | Landau | |
| 5,207,456 | A | 5/1993 | Danhoff | |
| 5,417,510 | A | 5/1995 | Stout | |
| D379,334 | S | 5/1997 | Rohweder | |
| 6,641,345 | B2 | 11/2003 | Cobene, II et al. | |
| 7,048,269 | B2 | 5/2006 | Hoarau | |
| 7,490,860 | B2 | 2/2009 | Didde | |
| 7,661,715 | B2 | 2/2010 | Porat | |
| D657,503 | S | 4/2012 | January | |
| 8,668,228 | B2 | 3/2014 | Holmberg | |
| 10,016,999 | B2 | 7/2018 | Parmar | |
| D878,216 | S | 3/2020 | Janus | |
| 2002/0182033 | A1 | 12/2002 | Weiss | |
| 2003/0170094 | A1 | 9/2003 | Yew | |
| 2004/0245694 | A1 | 12/2004 | Hoarau | |
| 2006/0061083 | A1 * | 3/2006 | Didde | B42D 1/002 281/21.1 |
| 2007/0085321 | A1 | 4/2007 | Huang | |
| 2010/0176583 | A1 | 6/2010 | Reiter | |
| 2011/0079996 | A1 | 4/2011 | Seid | |
| 2011/0298202 | A1 * | 12/2011 | Hocking | B42C 19/00 412/1 |
| 2014/0178153 | A1 | 6/2014 | Hocking | |

FOREIGN PATENT DOCUMENTS

| | | | | |
|---|---|---|---|---|
| EP | 0158493 | A2 | | 10/1985 |
| EP | 1967384 | A1 | | 9/2008 |
| EP | 2570268 | A2 | | 3/2013 |
| FR | 963614 | A | * | 7/1950 |
| GB | 285306 | A | | 2/1928 |
| GB | 310059 | A | | 12/1929 |
| GB | 1443011 | A | | 7/1976 |
| JP | 2012218445 | A | | 11/2012 |
| JP | 6537219 | B2 | | 7/2019 |
| KR | 20190104479 | A | * | 9/2019 |
| WO | 0145960 | A1 | | 6/2001 |

OTHER PUBLICATIONS

FR963614A English Translation (Year: 1950).*

ISA US Patent Office, International Search Report and Written Opinion Issued in Application No. PCT/US21/31555, Aug. 23, 2021, WIPO, 11 pages.

* cited by examiner

BOUND COLLECTION OF LEAVES FEATURING REGION OF REDUCED CUMULATIVE LEAF THICKNESS

CROSS REFERENCE TO RELATED APPLICATIONS

This application claims priority to International Patent Application Serial No. PCT/US2021/031555 filed on May 10, 2021, which claims priority to and the benefit of U.S. provisional patent application Ser. No. 63/101,609, filed May 8, 2020 and U.S. provisional application Ser. No. 63/103,994, filed Sep. 8, 2020, which are incorporated herein by reference in their entirety for all purposes.

BACKGROUND

Books are bound collections of leaves that can take a variety of forms and provide a variety of functions. As an example, books can be bound using a variety of binding techniques, including adhesive bindings, sewn bindings, ring bindings, spiral bindings, post bindings, stapled bindings, clamped bindings, etc. Leaves of a book can be formed from a variety of materials, including wood-based paper, paper board, polymer, textile, parchment, vellum, papyrus, and other suitable materials or combinations thereof. Leaves can be formed from a sheet material that is flexible, semi-flexible, or rigid, depending on the particular configuration and intended use of the book. Books can feature text, images, or other graphical content on pages that form opposing faces of the leaves. Books can serve as literature, textbooks, magazines, catalogs, instruction manuals, etc. As additional examples, books can include blank or ruled notebooks, sketchbooks, sketch pads, journals, calendars, planners, etc. Books can feature a rigid hard cover in a hardback configuration, a soft or flexible cover in a softback configuration, or can be offered without a cover. Books having leaves that are able to lay flat and/or be wrapped around up to 360 degrees with limited resistance and bulging of the leaves can offer a number of advantages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to an example, an article of manufacture including a bound collection of leaves having a spine is disclosed. Each leaf of a first plurality of leaves of the bound collection includes a first pattern of tabs by which that leaf is bound. The tabs of the first pattern are distributed along a binding axis of that leaf that is parallel to a spine axis of the spine. Each leaf of a second plurality of leaves of the bound collection includes a second pattern of tabs by which that leaf is bound. The tabs of the second pattern are distributed along a binding axis of that leaf that is parallel to the spine axis of the spine. Each tab of the first pattern of tabs and the second pattern of tabs extends in a direction orthogonal to the binding axis of its leaf from within an unbound region of that leaf to a binding-side edge of that leaf. The first pattern of tabs differs from the second pattern of tabs along at least a portion of the spine axis.

According to another example, a method of manufacturing a bound collection of leaves having a spine is disclosed. The method includes forming a first plurality of leaves. Each leaf of the first plurality of leaves includes a first pattern of tabs distributed along a binding axis of that leaf. The method further includes forming a second plurality of leaves. Each leaf of the second plurality of leaves includes a second pattern of tabs distributed along a binding axis of that leaf. The method further includes assembling the first plurality of leaves and the second plurality of leaves to form a collection of leaves such that each binding axis of the first plurality of leaves and the second plurality of leaves is oriented parallel to a spine axis of the spine. The method further includes binding each leaf of the collection of leaves to form the bound collection of leaves by, for each leaf of the first plurality of leaves, binding that leaf within the bound collection by the first pattern of tabs of that leaf, and for each leaf of the second plurality of leaves, binding that leaf within the bound collection by the second pattern of tabs of that leaf. Each tab of the of the first pattern of tabs and the second pattern of tabs within the bound collection of leaves extends in a direction orthogonal to the binding axis of its leaf from within an unbound region of that leaf to a binding-side edge of that leaf. The first pattern of tabs differs from the second pattern along at least a portion of the spine axis.

According to another example, a bound collection of leaves having a spine is disclosed. Each leaf of a plurality of leaves of the bound collection has a reduced cross section that extends from within an unbound region of that leaf to a binding-side edge of that leaf on a dimension orthogonal to a spine axis of the spine. Each leaf of the bound collection can be formed from a unitary piece of leaf material, as an example. Each leaf of the plurality of leaves can be edge bound within the bound collection along the binding-side edge by an adhesive, as an example.

DETAILED DESCRIPTION

Figure 1A:
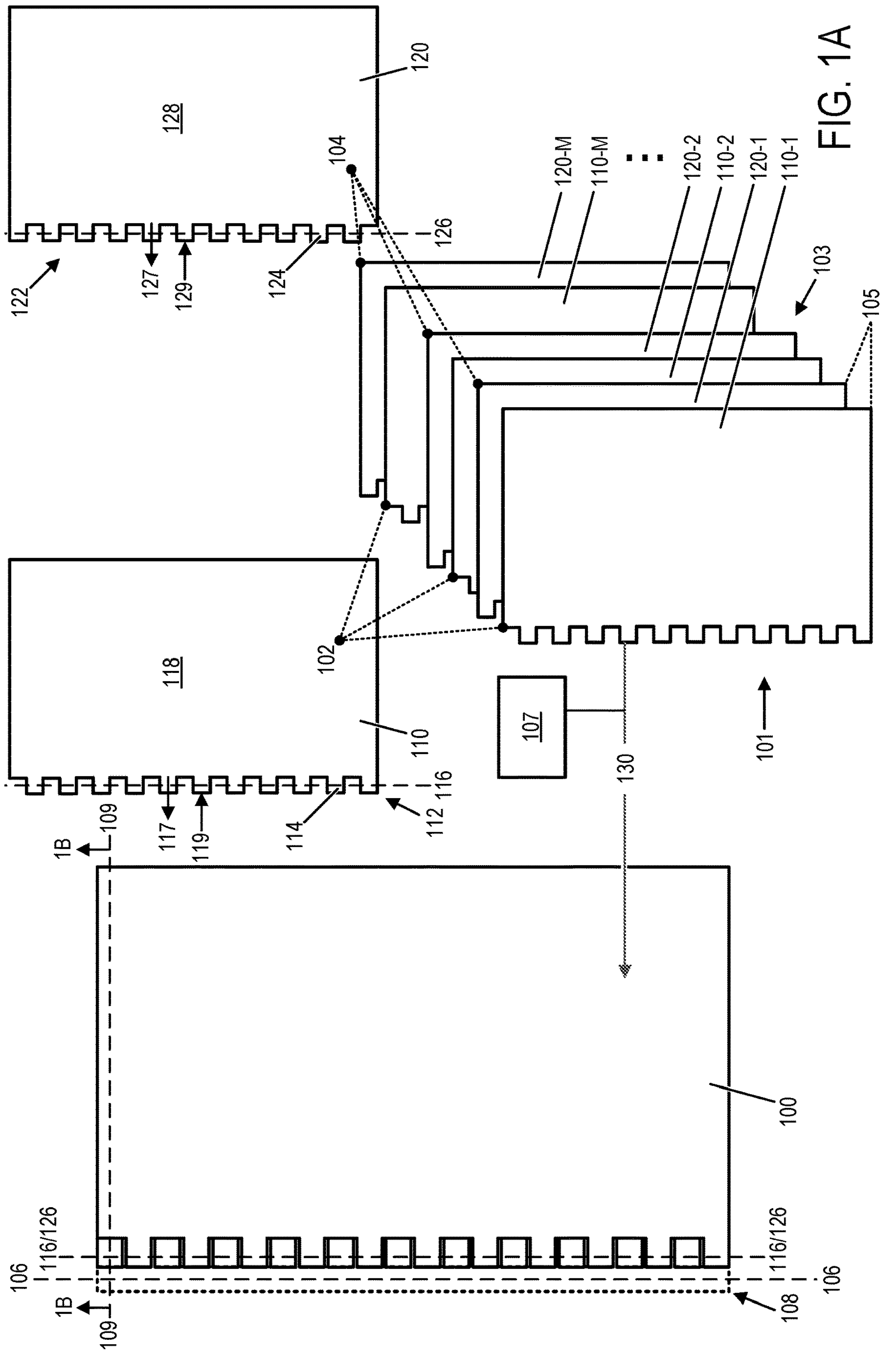
FIG. 1A schematically depicts an example of a bound collection of leaves as an article of manufacture.

As introduced briefly above, several configurations of a bound collection of leaves and their methods of manufacture are disclosed. These bound collections incorporate leaves that collectively provide a region of reduced cumulative leaf thickness in a dimension of a bound order of the leaves. This region of reduced cumulative leaf thickness can extend from within an unbound region of the leaves to a binding-side edge of the leaves, thereby spanning both bound and unbound regions of the leaves. This approach has the potential to provide improved functionality and performance in terms of the ability for the leaves of a bound collection to attain a flatter state when held open or when laying open at 180 degrees or 360 degrees, and/or for leaves of the bound collection to be wrapped around up to 360 degrees with less resistance and/or bulging of the leaves as compared to prior approaches. Additionally or alternatively, this approach has the potential to provide improved durability when used in connection with certain binding techniques, and can be adapted to a multitude of form factors.

According to one example disclosed herein, each leaf of a first plurality of leaves of a bound collection (e.g., a book) includes a first pattern of tabs by which that leaf is bound. The tabs of the first pattern are distributed along a binding axis of that leaf that is parallel to a spine axis of a spine of the bound collection. Each leaf of a second plurality of leaves of the bound collection includes a second pattern of tabs by which that leaf is bound. The tabs of the second pattern are distributed along a binding axis of that leaf that is parallel to the spine axis of the spine. Each tab of the first pattern of tabs and the second pattern of tabs extends in a direction orthogonal to the binding axis of its leaf from within an unbound region of that leaf to a binding-side edge of that leaf. Accordingly, these tabs can be referred to as binding-side edge tabs. The first pattern of tabs differs from the second pattern of tabs along at least a portion of the spine axis. As an example, some or all of the tabs of the first pattern of tabs can be offset from each tab of the second pattern of tabs in a dimension parallel to the spine axis. This configuration can provide a region of reduced cumulative leaf thickness in a dimension of a bound order of the leaves, thereby improving lay flat and/or wrap around functionality.

According to another example of the present disclosure, each leaf of a plurality of leaves of a bound collection (e.g., a book) has a reduced cross section that extends from within an unbound region of that leaf to a binding-side edge of that leaf on a dimension orthogonal to a spine axis of the bound collection. Each leaf of the bound collection can be formed from a unitary piece of leaf material, in at least some examples. In other examples the leaves could be formed from multiple materials. Furthermore, each leaf of the plurality of leaves can be edge bound within the bound collection along the binding-side edge of the leaf (e.g., by an adhesive or sewn binding), in at least some examples. This approach of using leaves of reduced cross section can be used independently or in combination with the binding-side edge tabs described above.

FIG. 1A schematically depicts an example of a bound collection 100 of leaves 101 as an article of manufacture. The example bound collections disclosed herein, including at least bound collection 100 can be referred to as a book or codex. The leaves of the bound collections disclosed herein, including at least leaves 101 of bound collection 100 can take the form of individual leaves or can form part of a sheet that is folded to create two or more leaves. Each leaf has two opposing faces referred to as pages upon which text, images, or other graphical content can be provided.

In the example depicted in FIG. 1A, bound collection 100 of leaves 101 includes a first plurality of leaves 102 and a second plurality of leaves 104. While leaves 101 of bound collection 100 are depicted schematically in FIG. 1A as including six leaves, it will be understood that bound collection 100 can include tens, hundreds, thousands, or more leaves. Thus, bound collection 100 can include, as part of the collection of leaves 101, additional leaves beyond those depicted in FIG. 1A (e.g., leaves that do not feature binding-side edge tabs), a cover assembly, and/or ribbons and other types of page markers, and/or folded elements, etc. A cover assembly can include one or more portions that form a cover of the bound collection as well as one or more intermediate components that are used to couple the cover to the bound collection.

Leaves 101 of bound collection 100, including the first plurality of leaves 102 and the second plurality of leaves 104 (and other types of leaves described herein) can be formed from any suitable material or combination of materials. Examples of materials that can be suitable for leaves of a bound collection include wood-based paper, paper board, polymer, textile, metal, parchment, vellum, papyrus, or a combination of materials. Leaves 101 of bound collection 100 can be flexible or at least partially flexible (e.g., can include rigid components along a portion of the leaf).

Leaf 110 represents an example leaf of the first plurality of leaves 102. As shown with reference to leaf 110, each leaf of the first plurality of leaves 102 includes a first pattern of tabs 112 by which that leaf is bound within bound collection 100. Tab 114 is an example tab of the first pattern of tabs 112. The first pattern of tabs 112 are distributed along a binding axis 116 of leaf 110 that is parallel to a spine axis 106 of a spine 108 of bound collection 100 when the leaf is bound within the bound collection. Each tab of the first pattern of tabs 112 extends in a direction 117 that is orthogonal to binding axis 116 of leaf 110 from within an unbound region 118 to a binding-side edge 119 of the leaf. Unbound region 118 can have text, images, or other graphical content located (e.g., printed) upon opposing faces (i.e., pages) of the leaf, in at least some examples. However, in at least some examples, unbound region 118 can be blank.

Leaf 120 represents an example leaf of the second plurality of leaves 104. As shown with reference to leaf 120, each leaf of the second plurality of leaves 104 includes a second pattern of tabs 122 by which that leaf is bound within bound collection 100. Tab 124 is an example tab of the second pattern of tabs 122. The second pattern of tabs 122 are distributed along a binding axis 126 of leaf 120 that is also parallel to spine axis 106 when bound within bound collection 100. Each tab of the second pattern of tabs 122 extends in a direction 127 that is orthogonal to binding axis 126 of leaf 120 from within an unbound region 128 of the leaf to a binding-side edge 129 of that leaf. Unbound region 128 can have text, images, or other graphical content located (e.g., printed) upon opposing faces (i.e., pages) of the leaf, in at least some examples.

Within bound collection 100, the first pattern of tabs 112 differs from the second pattern of tabs 122 along some or all of spine axis 106 of spine 108. As an example, the first pattern of tabs 112 and the second pattern of tabs 122 can alternate with each other along spine axis 106 such that some or all tabs of the first pattern of tabs do not interfere with some or all tabs of the second pattern of tabs when individual leaves are turned or rotated relative to spine axis 106. A pattern of tabs (e.g., 102) that reside entirely within respective gaps between tabs of another pattern of tabs (e.g., 104) can be referred to as being fully nested. While fully nested examples are provided herein, it will be understood that two or more patterns of tabs can be partially nested, in at least some examples, such that a pattern of tabs partially overlaps with respective tabs of another pattern of tabs.

Spine 108 is depicted schematically in FIG. 1A. Spine 108 can take a variety of forms as described in further detail with reference to FIGS. 2A-2F. As an example, spine 108 can be formed from one or more spine components, including a binding-side edge and other binding regions of the leaves of the bound collection, binding materials and/or components, cover components, and intermediate components that couple the cover components to the binding components.

Leaves 101, including at least the first plurality of leaves 102 and the second plurality of leaves 104 (and optionally one or more additional leaves represented by block 107 in FIG. 1A) can be assembled and bound as indicated schematically at 130 to form bound collection 100. Each leaf of bound collection 100 has a bound order relative to each other leaf of the bound collection within a reference plane 109 that is orthogonal to spine axis 106. FIGS. 3A-3E provide example views of bound collection 100 along spine axis 106.

Leaves 101 of bound collection 100 have a collection sequence 103 that refers to an overall sequence or bound order of the leaves within the bound collection. Collection sequence 103 can have a predefined sequence or this sequence can be random in at least some examples. Some or all of collection sequence 103 can be formed by a repeating sequence 105 of leaves that feature two or more (e.g., two, three, four, five, six, etc.) patterns of tabs that differ from each other. A repeating sequence can additionally include other types of leaves that do not feature binding-side edge tabs.

While at least some examples disclosed herein include a first plurality leaves that feature a first pattern of tabs and a second plurality of leaves that feature a second pattern of tabs, in yet another example, individual leaves of a bound collection can feature a unique pattern (a leaf-specific pattern) of tabs that differs from all other leaves of the bound collection. These individual leaves that feature their own unique, leaf-specific pattern of tabs can be bound in the bound collection with other leaves that that feature a pattern of tabs that is present within two or more leaves of the bound collection. Furthermore, in at least some examples, all leaves of a bound collection that feature binding-side edge tabs could have a unique, leaf-specific pattern of tabs that differs from all other leaves of the bound collection that feature binding-side edge tabs. In still further examples some or all leaves of a bound collection that feature binding-side edge tabs can use a random or pseudo random pattern of tabs while achieving a cumulative reduction in leaf thickness within a region of the bound collection that includes a binding region and an unbound tab region.

In at least some examples, the bound order of leaves 101 within bound collection 100 includes the first plurality of leaves 102 interleaved with the second plurality of leaves 104. As an example, repeating sequence 105 of the bound order can include a subset of the first plurality of leaves 102 featuring first pattern 112 followed by a subset of the second plurality of leaves 104 featuring second pattern 114. A quantity of leaves in each subset can be constant or can vary as the sequence is repeated throughout the bound collection. As an example, the subset of the first plurality of leaves 102 can consist of one leaf of the first plurality of leaves, and the subset of the second plurality of leaves 104 can consist of one leaf of the second plurality of leaves across some or all of the repeating sequence of the bound collection. As another example, the subset of the first plurality of leaves 102 can include two or more leaves of the first plurality of leaves, and the subset of the second plurality of leaves 104 can include two or more leaves of the second plurality of leaves across some or all of the repeating sequence.

Figure 1B:
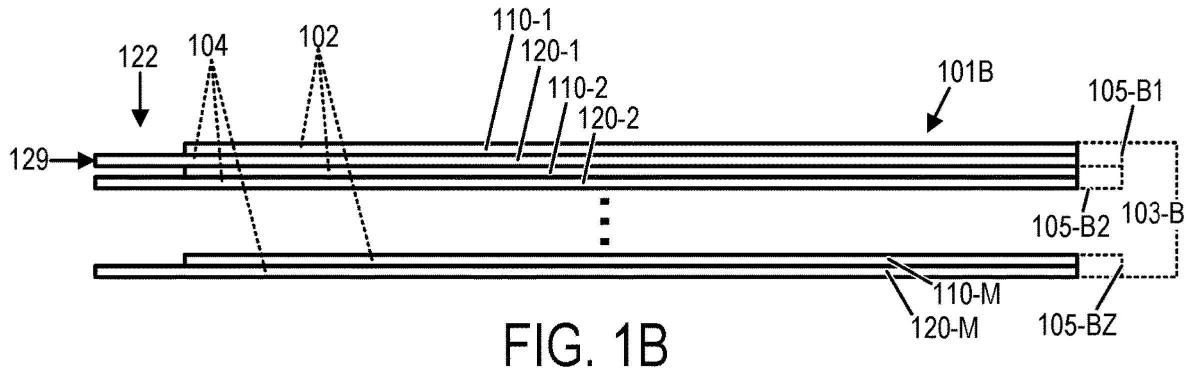
FIG. 1B schematically depicts an example sequence of leaves of the bound collection of FIG. 1A.

FIG. 1A schematically depicts respective instances of leaf 110 of the first plurality of leaves 102 as leaves 110-1, 110-2 . . . 110-M interleaved with respective instances of leaf 120 of the second plurality of leaves 104 as leaves 120-1, 120-2 . . . 120-M, where the variable "M" can represent any suitable quantity of leaves. In this example, individual leaves of the first plurality of leaves 102 can be represented by a leaf type identifier "A", and individual leaves of the second plurality of leaves 104 can be represented by a leaf type identifier "B" having an order represented by the sequence "ABABAB" within bound collection 100. This order represented by an "AB" repeating sequence of leaves can be carried throughout some or all of leaves 101 of bound collection 100. FIG. 1B depicts an example of this "AB" repeating sequence of leaves as viewed in direction 1B of FIG. 1A from plane 109 that is orthogonal to spine axis 106.

Referring also to FIG. 1B, leaves 101B are an example of previously described leaves 101 of FIG. 1A. Within FIG. 1B, the second pattern of tabs 122 are visible along plane 109, but the first pattern of tabs 112 are not visible because plane 109 passes through gaps formed between the boundary of the leaves and tabs of the first pattern of tabs in this particular view. Furthermore, in this example, a collection sequence 103-B of leaves 110 and 120 includes a repeating sequence 105B having individual instances of that repeating sequence represented as 105-B1, 105-B2, etc. through 105-BZ, where "Z" represents any suitable quantity of repeating sequence 105B in collection sequence 103B.

Figure 1C:
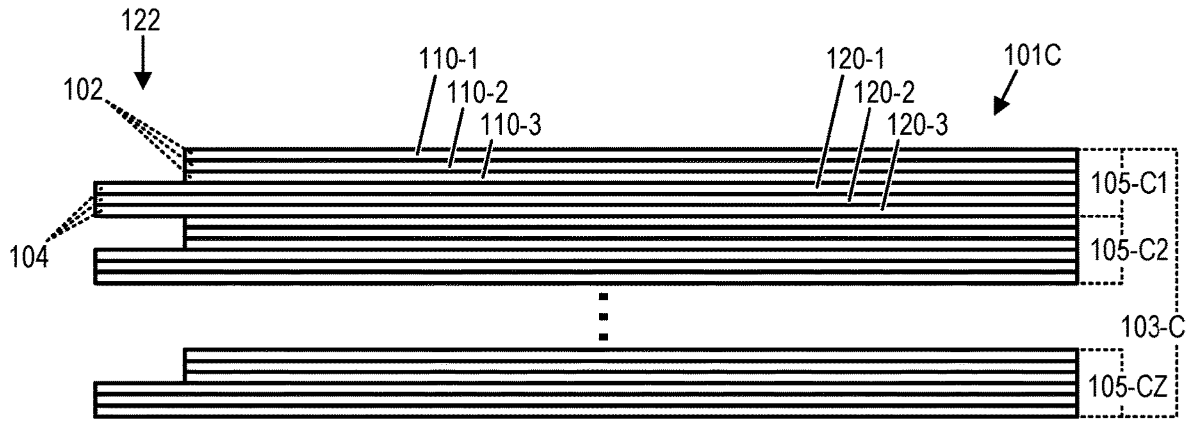
FIG. 1C schematically depicts another example sequence of leaves of the bound collection of FIG. 1A.

As another example, leaves 101 of bound collection 100 can have a bound order in which two or more leaves of the first plurality of leaves 102 can form a neighboring group of leaves (e.g., formed as part of a first signature) that is interleaved with two or more leaves of the second plurality of leaves 104 that forms another neighboring group of leaves (e.g., formed as part of a second signature). These neighboring groups of leaves can include two, three, four, five, six, seven, eight, nine, ten or more leaves. In the case of a 16-page signature, the signature can be used to form a neighboring group of 8 leaves. Furthermore, these various bound order configurations can be represented by a repeating sequence of "AABB", "AAABBB", "AAAABBBB", "AAAAABBBBB", etc. within bound collection 100. For example, where a 16-page signature is used, the repeating sequence can include eight leaves of type "A" followed by eight leaves of type "B". While repeating sequences of leaf groupings are described, it will be understood that a quantity of leaves within each grouping can vary within a bound collection. FIG. 1C depicts an example of this "AAAABBB" repeating sequence of leaves as may be viewed in direction 1B of FIG. 1A from plane 109 that is orthogonal to spine axis 106.

Referring also to FIG. 1C, leaves 101C are an example of previously described leaves 101 of FIG. 1A. Within FIG. 1C, the second pattern of tabs 122 are again visible along plane 109. Furthermore, in this example, a collection sequence 103-C of leaves 110 and 120 (e.g., 110-1, 110-2, 110-3, 120-1, 120-2, 120-3) includes a repeating sequence 105C having individual instances of that repeating sequence represented as 105-C1, 105-C2, etc. through 105-CZ, where "Z" represents any suitable quantity of repeating sequence 105C in collection sequence 103C.

A bound collection of leaves, such as bound collection 100 can include additional patterns of tabs that differ from the first and second patterns 112, 122 along spine axis 106. As an example, each leaf of a third plurality of leaves of the bound collection can include a third pattern of tabs by which that leaf is bound, in which the third pattern of tabs is distributed along a binding axis of that leaf that is parallel to the spine axis (e.g., 106) of the spine. Each tab of the third pattern of tabs can extend in a direction orthogonal to the binding axis of its leaf from within an unbound region of that leaf to a binding-side edge of that leaf. As previously described, this third pattern of tabs can differs from both the first pattern of tabs and the second pattern of tabs along some or all of the spine axis. Furthermore, in at least some examples, a bound order of this bound collection can include a repeating sequence of a subset of the first plurality of leaves (e.g., 102) followed by a subset of the second plurality of leaves (e.g., 104) followed by a subset of the third plurality of leaves. For example, a bound order can include a repeating sequence of individual leaves of different patterns or neighboring groups of leaves of different patterns, such as "ABC", "AABBCC", "AAABBBCCC", etc., where "C" refers to a leaf of the third plurality of leaves having the third pattern of tabs. Further still, tabs of the third pattern of tabs can be offset from tabs of the first and second patterns along the spine axis, can be fully nested or partially nested within gaps formed between tabs of the first pattern and/or gaps formed between tabs of the second pattern.

Figure 2A:
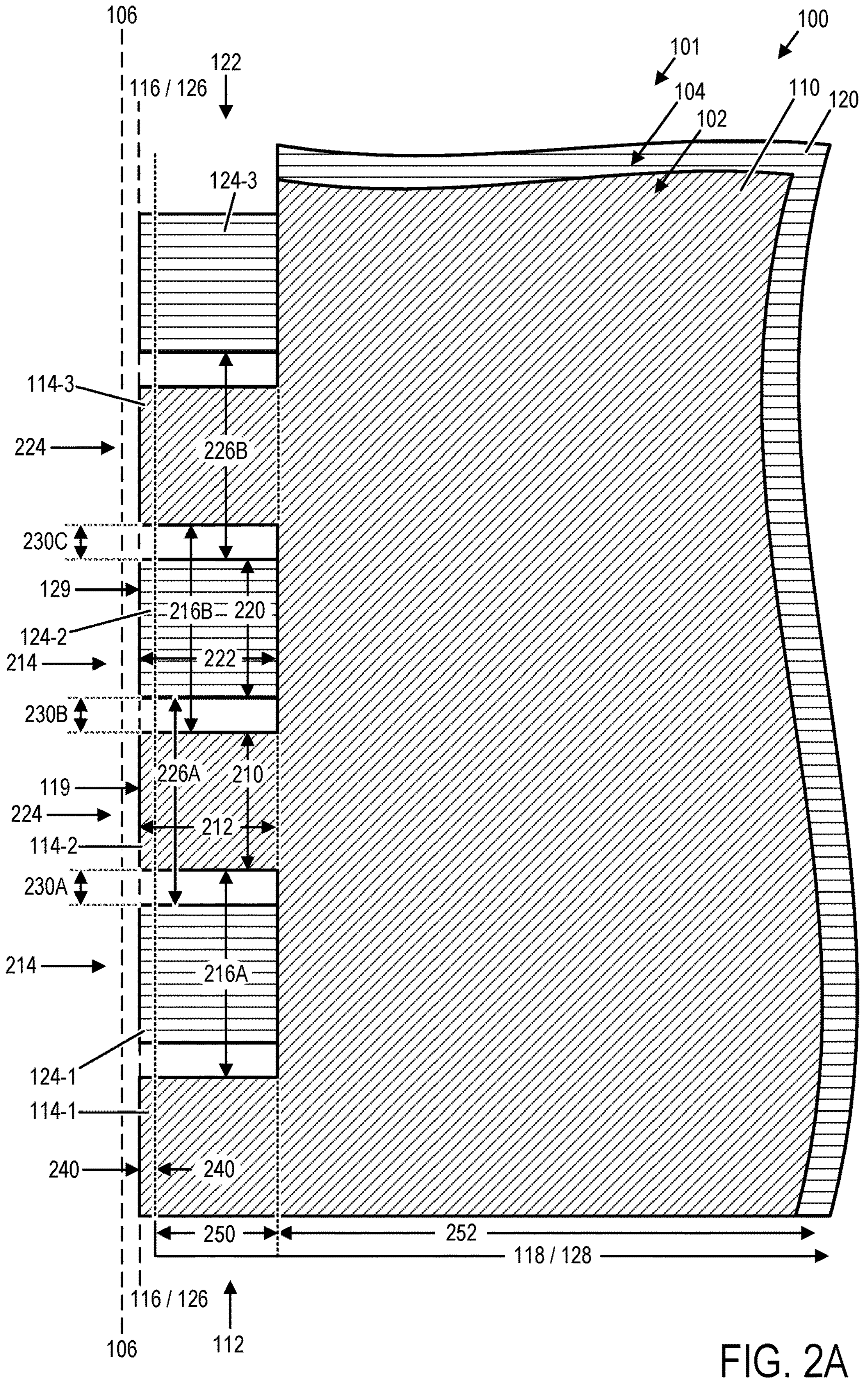
FIG. 2A shows a detailed view of a portion of the bound collection of FIG. 1A.

FIG. 2A shows a detailed view of a portion of bound collection 100 of FIG. 1A. Within FIG. 2A, a portion of each of leaves 110 and 120 are each depicted with different shading for illustrative purposes, with leaf 110 being located in front of and partially covering leaf 120. As previously described with reference to FIG. 1A, leaf 110 represents an example leaf of the first plurality of leaves 102 that can form part of bound collection 100. Similarly, leaf 120 represents an example leaf of the second plurality of leaves 104 that can form part of bound collection 100. It will be understood that bound collection 100 can include any suitable quantity of leaves 101, including many instances of leaf 110 being interspersed with many instances of leaf 120.

Multiple instances of tab 114 of leaf 110 of FIG. 1A are depicted in FIG. 2A as tabs 114-1, 114-2, 114-3, etc., which are members of the first pattern of tabs 112 of leaf 110. Similarly, multiple instances of tab 124 of leaf 120 of FIG. 1A are depicted in FIG. 2A as tabs 124-1, 124-2, 124-3, etc., which are members of the second pattern of tabs 122 of leaf 120. Referring to example tab 114-2, each tab of the first pattern of tabs 112 has a respective tab length 210 as measured in a dimension parallel to binding axis 116 of leaf 110 and spine axis 106 when leaf 110 is bound within the bound collection. Furthermore, each tab of the first pattern of tabs 112 has a respective tab width 212 as measured in a dimension orthogonal to binding axis 116 and spine axis 106 when leaf 110 is bound within the bound collection.

Each tab of the first pattern of tabs 112 is spaced apart from one or more neighboring tabs of the first pattern of tabs by an intra-leaf gap 214 having an intra-leaf gap length in the dimension parallel to both spine axis 106 and binding axis 116 of leaf 110. Referring again to example tab 114-2, this tab is spaced apart from tab 114-1 by intra-leaf gap 214 having an intra-leaf gap length 216A, and from tab 114-3 by intra-leaf gap 214 having an intra-leaf gap length 216B. In this example, the intra-leaf gap length between each neighboring pair of tabs of the first pattern of tabs 112 is equal among the first pattern of tabs to provide regular tab (e.g., equal-sized tabs) and gap intervals. However, in other examples, the intra-leaf gap length between neighboring pairs of tabs of the first pattern of tabs 112 can be variable along binding axis 116 and spine axis 106. While tabs of the first pattern of tabs 112 are shown having a generally rectangular form, it will be understood the some or all of these tabs can taper inward or outward progressing in the dimension of tab width 212 that is orthogonal to binding axis 116 to thereby provide a variable tab length 210. Furthermore, binding-side edge tabs can have curved profiles in at least some examples. However, binding-side edge tabs typically feature a binding-side edge that is parallel to the spine axis of the bound collection where an edge binding is used to provide sufficient binding strength and durability.

Referring to example tab 124-2, each tab of the second pattern of tabs 122 has a respective tab length 220 as measured in a dimension parallel to binding axis 126 of leaf 120 and spine axis 106 when leaf 120 is bound within the bound collection. Furthermore, each tab of the second pattern of tabs 122 has a respective tab width 222 as measured in the dimension orthogonal to binding axis 126 and spine axis 106 when leaf 120 is bound within the bound collection.

Each tab of the second pattern of tabs 122 is spaced apart from one or more neighboring tabs of the second pattern of tabs by an intra-leaf gap 224 having an intra-leaf gap length in the dimension parallel to both spine axis 106 and binding axis 126 of leaf 120. Referring to example tab 124-2, this tab is spaced apart from tab 124-1 by intra-leaf gap 224 having an intra-leaf gap length 226A, and from tab 124-3 by intra-leaf gap 224 having an intra-leaf gap length 226B. In this example, the intra-leaf gap length between each neighboring pair of tabs of the second pattern of tabs 122 is equal among the second pattern of tabs to provide regular tab (e.g., equal-sized tabs) and gap intervals. However, in other examples, the intra-leaf gap length between each neighboring pair of tabs of the second pattern of tabs 122 can be variable among the second pattern of tabs. While tabs of the second pattern of tabs 122 are shown having a generally rectangular form, it will be understood that some or all of these tabs can taper inward or outward progressing in the dimension of tab width 222 that is orthogonal to binding axis 126 to thereby provide a variable tab length 220.

Some or all (e.g., one or more) tabs of the first pattern of tabs 112 can be offset from each tab of the second pattern of tabs in a dimension parallel to the spine axis. As an example, tabs of the first pattern of tabs 112 can be aligned with gaps 224 between tabs of the second pattern of tabs 122 along a dimension parallel to spine axis 106, and tabs of the second pattern of tabs 122 can be aligned with gaps 214 between tabs of the first pattern of tabs 112 along the dimension parallel to spine axis 106. This configuration can provide a region of reduced cumulative leaf thickness in a dimension of a bound order or stack height of the leaves (into and out of the page of FIG. 2A), thereby improving lay flat and/or wrap around functionality of the bound collection.

For example, within the example of FIG. 2A, all tabs of the first pattern of tabs 112 are offset from all other tabs of the second pattern of tabs 122 in the dimension parallel to spine axis 106. Tab 114-2 of the first pattern of tabs 112, for example, is offset and spaced apart from tab 124-1 by an inter-leaf gap length 230A, and tab 114-2 is offset and spaced apart from tab 124-2 by an inter-leaf gap length 230B in the dimension parallel to spine axis 106. The use of inter-leaf gaps can provide clearances between or among the tabs of different tab patterns to reduce interference between or among the leaves. FIG. 2A depicts an example in which the tabs of the first pattern of tab 112 are fully nested within respective gaps formed between tabs of the second pattern of tabs 122; and the tabs of the second pattern of tab 122 are fully nested within respective gaps formed between tabs of the first pattern of tabs 112 such that the tabs of the two different patterns do not overlap each other in a dimension parallel to spine axis 106. Thus, these two different patterns of tabs provide a region of reduced cumulative leaf thickness (i.e., the total thickness of the leaves) in a dimension of the stack height or thickness of the bound collection (e.g., into and out of the page of FIG. 2A).

Thus, some or all (e.g., one or more tabs) of the second pattern of tabs can have a tab length in the dimension parallel to the spine axis and the binding axis of its leaf that is less than the intra-leaf gap length between two or more neighboring tabs of the first pattern of tabs. For example, some or all (e.g., one or more) tabs of the second pattern of tabs 122 can be sized and aligned along spine axis 106 to reside within the gap length between the two or more neighboring tabs of the first pattern of tabs 112. Similarly, some or all (e.g., one or more tabs) of the first pattern of tabs can have a tab length in the dimension parallel to the spine axis and the binding axis of its leaf that is less than the intra-leaf gap length between two or more neighboring tabs of the second pattern of tabs. Similarly, some or all (e.g., one or more) tabs of the first pattern of tabs 112 can be sized and aligned along spine axis 106 to reside within a gap length between the two or more neighboring tabs of the second pattern of tabs 122. This configuration can be referred to as an alternating tab configuration of leaves having different tab patterns.

FIG. 2A further shows an example of the tabs of leaves 110 and 120 extending from within their respective unbound regions 118 and 128 to their respective binding-side edges 119 and 129. Furthermore, depending on the particular type of binding of bound collection 100, each tab of leaves 110 and 120 can be edge bound along its respective binding-side edge (e.g., 119, 129) and/or can be bound within a broader binding region 240. Binding region 240, if present, can be proximate to and inclusive of the binding-side edge. For example, binding region 240 can extend inward toward unbound region 118 or 128 of the leaf from the binding-side edge in a direction that is orthogonal to spine axis 106 along a portion of the tabs. However, as depicted in FIG. 2A, at least a portion of the tabs of leaves 110 and 120 extend beyond binding region 240 to include an unbound tab region 250 that forms part of unbound region 118 or 128. In at least some examples, lay flat and wrap-around functionality and performance of a bound collection can be improved by reducing (or minimizing) the size of binding region 240 as measured in a dimension orthogonal to spine axis 106.

FIG. 2A further shows unbound regions 118 and 128 each including an unbound text block region 252 in addition to unbound tab region 250 that resides outside of or beyond binding region 240. Thus, a portion of each of the tabs of leaves 110 and 120 forms part of unbound tab region 250. In at least some examples, unbound tab region 250 can be larger than binding region 240 (inclusive of the binding-side edge) as measured in a dimension orthogonal to spine axis 106. Unbound text block region 252 can feature text, images, or other graphical content, as an example.

Figure 2B:
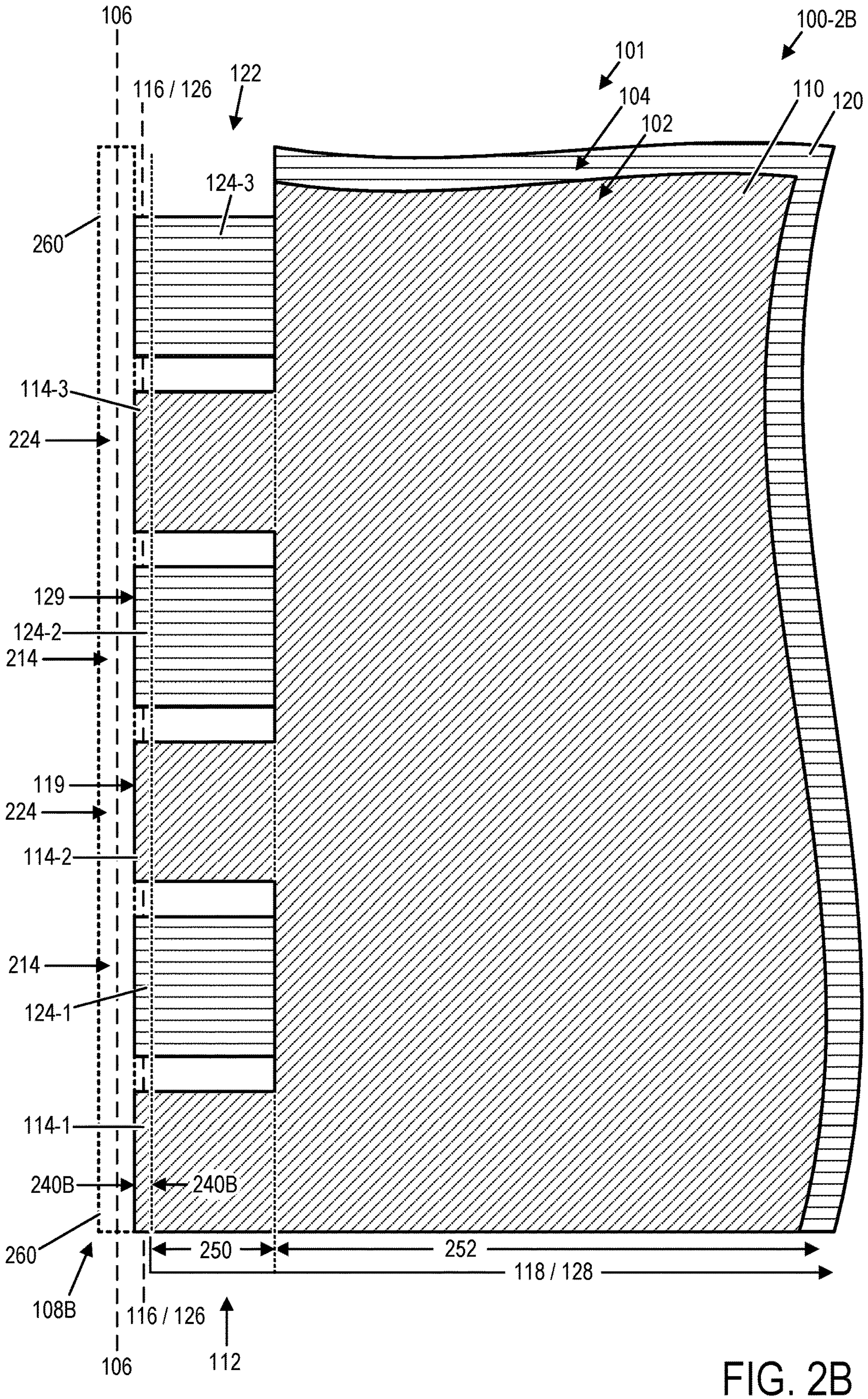
FIG. 2B shows a detailed view of the portion of the bound collection of FIG. 2A including an adhesive binding.
Figure 2C:
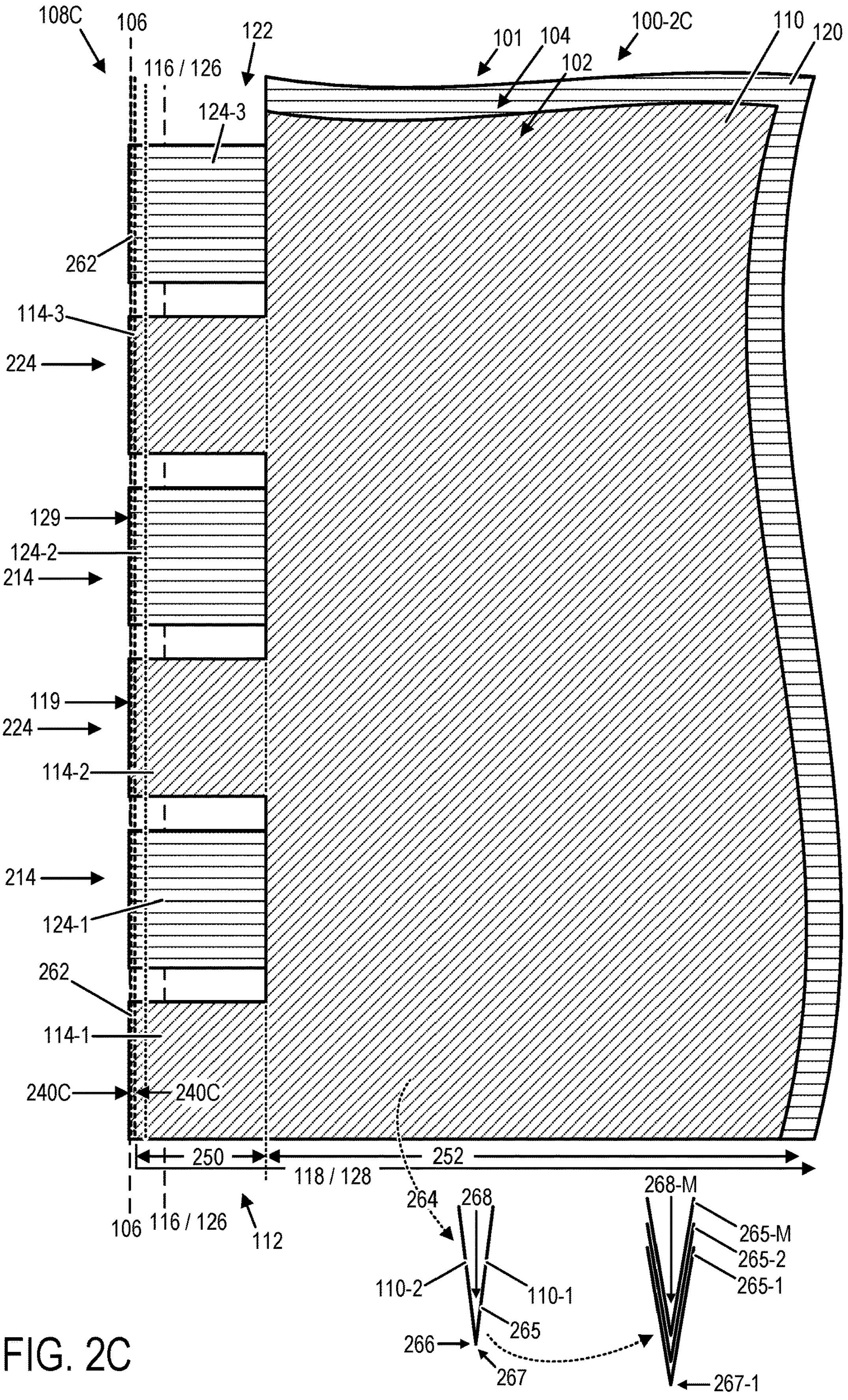
FIG. 2C shows a detailed view of the portion of the bound collection of FIG. 2A including a sewn binding.
Figure 2D:
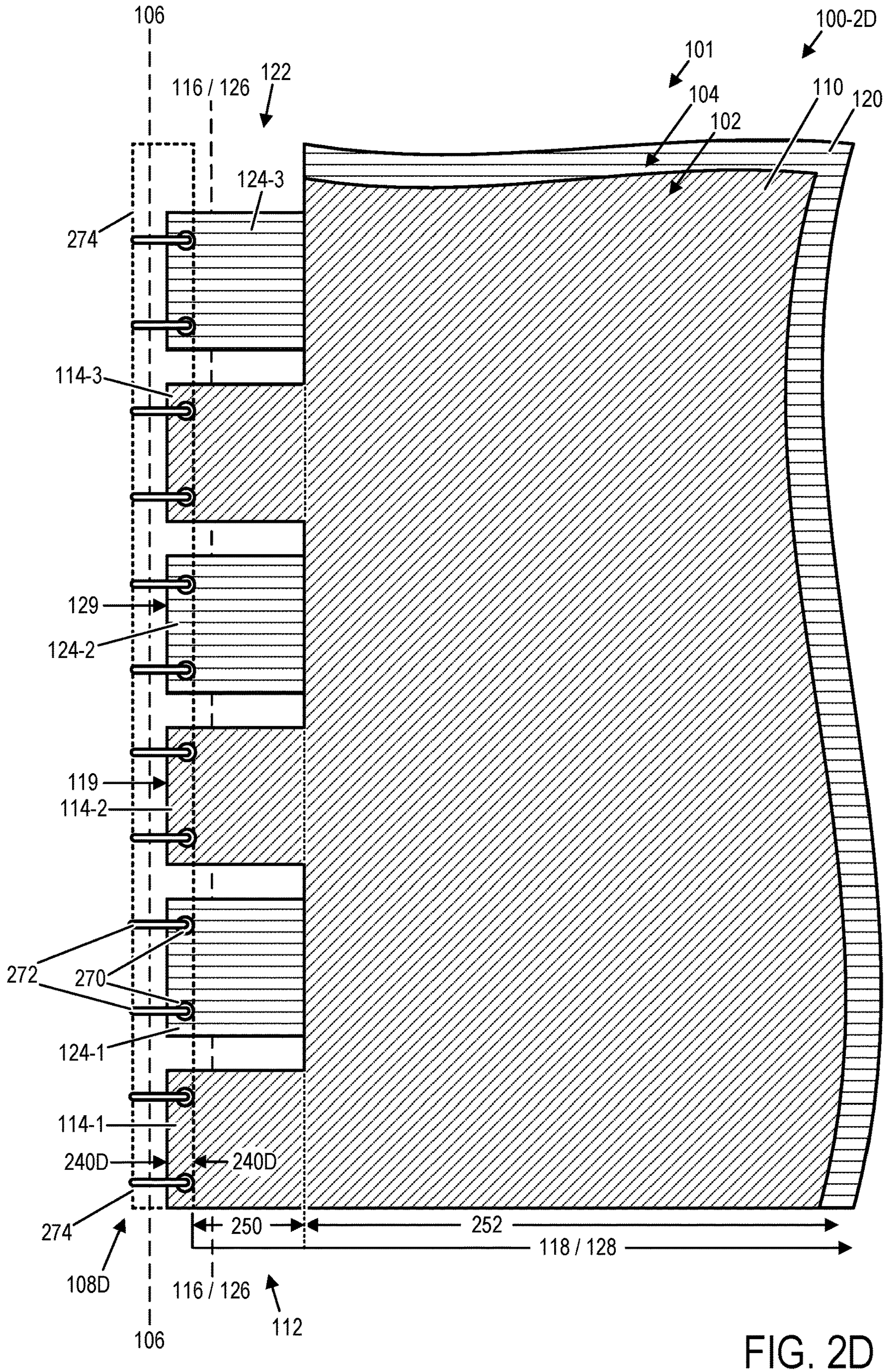
FIG. 2D shows a detailed view of the portion of the bound collection of FIG. 2A including a ring binding or a spiral binding.
Figure 2E:
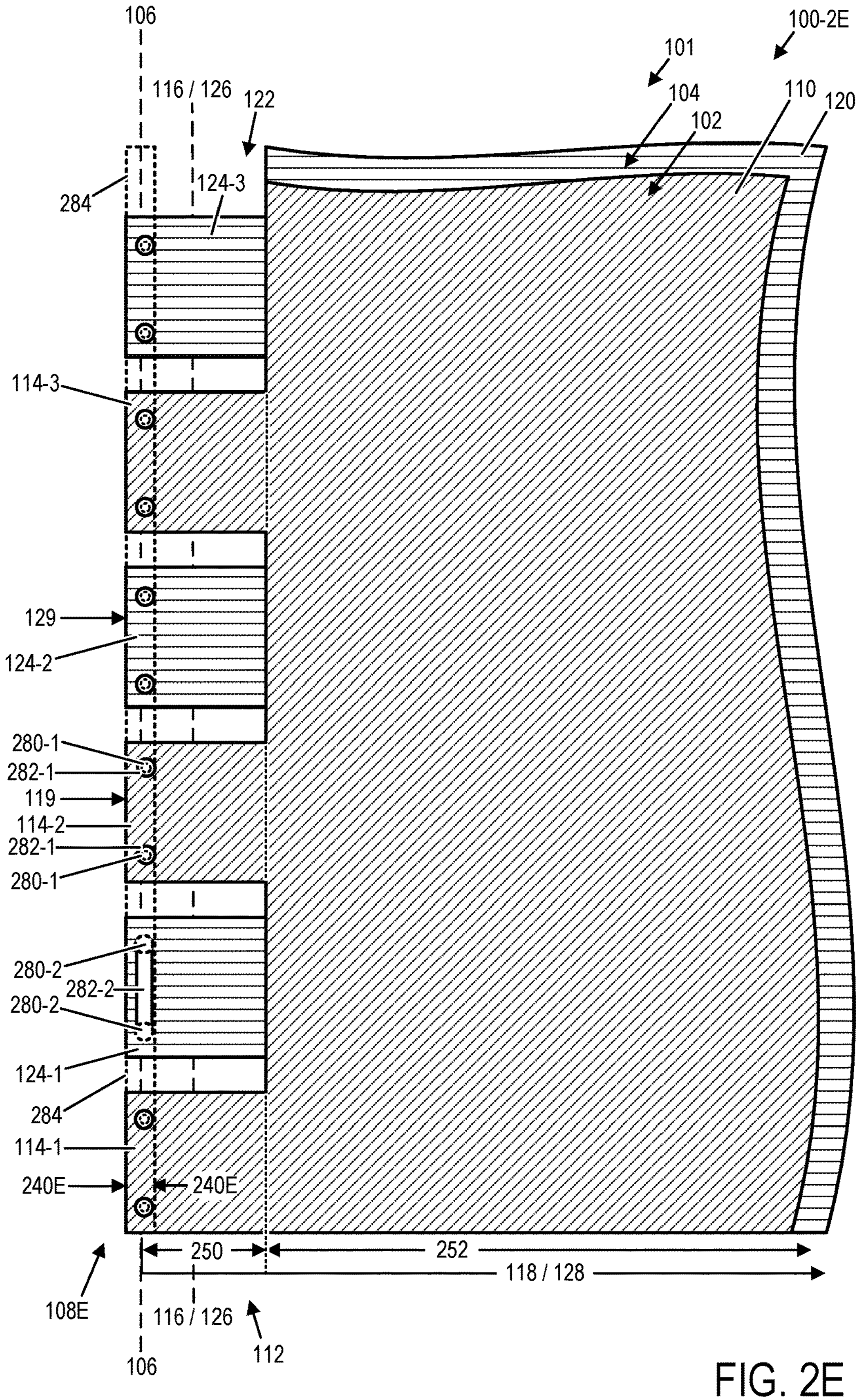
FIG. 2E shows a detailed view of the portion of the bound collection of FIG. 2A including a post binding or stapled binding.
Figure 2F:
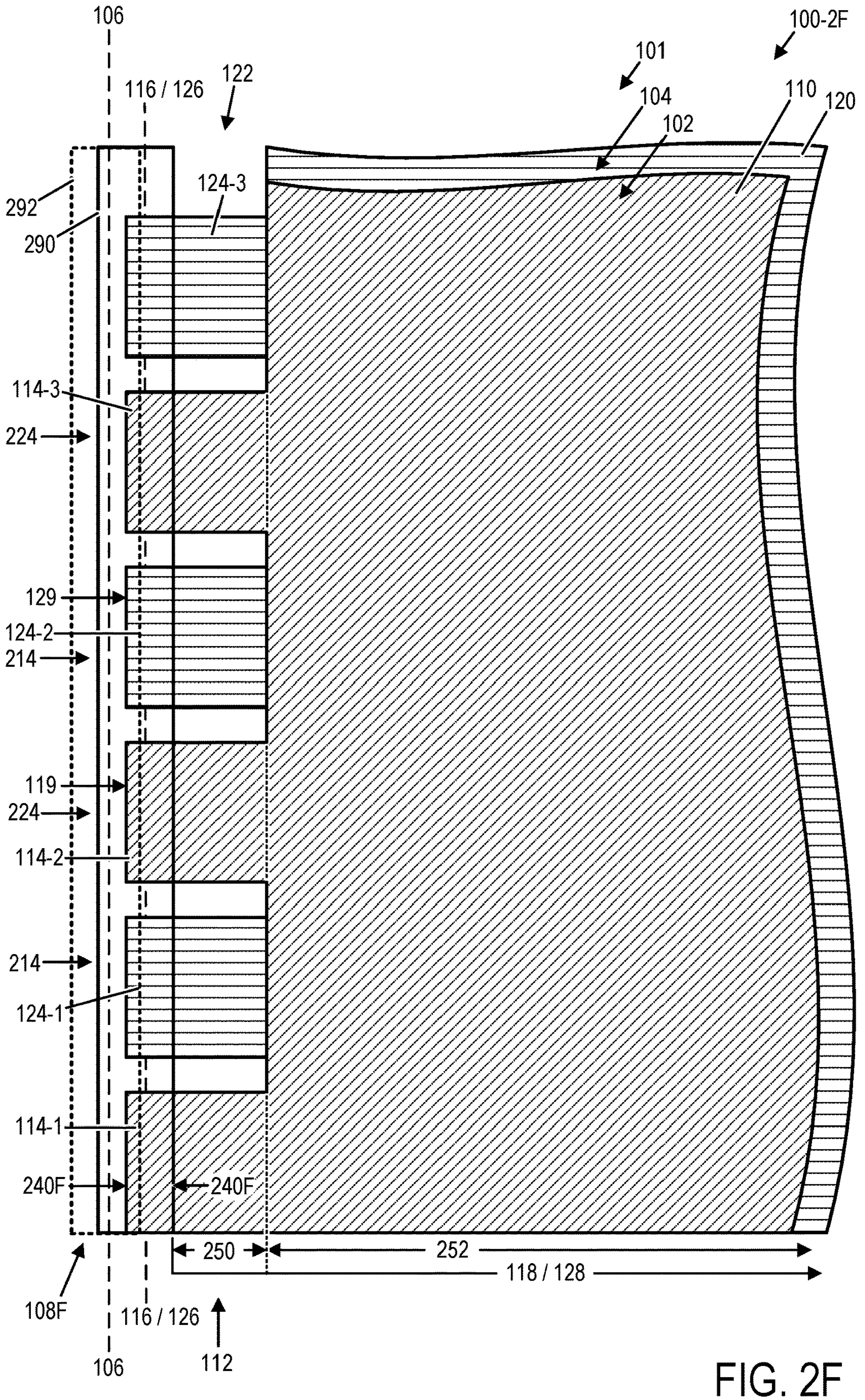
FIG. 2F shows a detailed view of the portion of the bound collection of FIG. 2A including a clamped binding.

FIGS. 2B-2F show detailed views of the portion of bound collection 100 of FIG. 2A including a variety of different bindings. FIGS. 2B and 2C depict examples of edge binding, FIG. 2D depicts an example of loose leaf binding, and FIGS. 2E-2F depict examples of off-edge binding. It will be understood that the configurations and techniques disclosed herein can be used with other types of bindings beyond the specific examples of FIGS. 2B-2F.

FIG. 2B shows bound collection 100-2B as an example of bound collection 100 including an adhesive binding provided by an adhesive 260. Adhesive 260 interfaces with at least binding-side edge 119 of each tab of the first pattern of tabs 112 and with at least binding-side edge 129 of each tab of the second pattern of tabs 122 to bind their respective leaves within the bound collection. When leaves 101 are bound within the bound collection along binding-side edges 119 and 129, this type of binding can be referred to as an edge binding. In another example of edge binding, the adhesive may be applied via tape.

While leaves 101 are bound by adhesive 260 along at least binding-side edges 119 and 129, in at least some examples, adhesive 260 can penetrate between the leaves and/or between the tabs of each leaf within binding region 240B as an example of binding region 240 of FIG. 2A. Penetration of adhesive 260 beyond binding-side edges 119 and 129 can reduce lay flat and/or wrap around functionality and performance as compared to edge binding with the adhesive being limited to the binding-side edges. However, binding strength can be increased, in at least some examples, by use of limited penetration of adhesive beyond binding-side edges 119 and 129 while also maintaining acceptable lay flat and/or wrap around functionality and performance. As an example, binding-side edges 119 and 129 can include notches to increase glue adhesion. These notches can be filled with an adhesive (e.g., glue) and can be cut along or across edges 119 and 129. In the example in which notches are cut along edges 119 and/or 129 in a way that exposes the surface area(s) of adjacent leaves it is intended that the glue or other adhesive penetrates the notches and adheres to the exposed surface area(s) adjacent the leaf edges of the adjacent leaves. Separately, in these and other examples, adhesive 260 does not entirely fill gaps 214 and 224 between the tabs and does not extend to unbound text block region 252, thereby preserving unbound tab region 250. This configuration enables at least a portion of the tabs to reside outside of or beyond binding region 240B, which can provide improved lay flat and/or wrap around functionality and performance as compared to other configurations in which adhesive entirely fills gaps located along a binding-side edge or covers the entire face of the tabs in place of unbound tab region 250.

Also within FIG. 2B, a spine 108B is schematically depicted, which represents an example of spine 108 of FIG. 1A. Within the context of an adhesive binding, spine 108B can include, as spine components, at least binding-side edges 119 and 129 of leaves 101 and adhesive 260 that binds each of the leaves within the bound collection (e.g., via their respective tabs). Spine 108B can further include, as additional components of the spine, one or more cover portions and/or intermediate components that couple the cover portions to adhesive 260.

FIG. 2C shows bound collection 100-2C as another example of bound collection 100 including a sewn binding 262. Sewn binding 262 is represented schematically in FIG. 2C as being located along and proximate to binding-side edges 119 and 129 of leaves 110 and 120 to provide an edge binding for bound collection 100-2C. A sewn binding can alternatively be offset from binding-side edges 119 and 129 to provide a side-sewn binding for a bound collection. Side-sewn binding is described in further detail with reference to FIG. 2E.

Within the context of bound collection 100-2C being edge bound by sewn binding 262, leaf 110 can represent one of the first plurality of leaves 102 that form a neighboring group of leaves as part of a first signature of one or more folded sheets. As shown in detailed view 264 of FIG. 2C, each folded sheet 265 of this first signature can form a pair of leaves (i.e., two leaves) of which a first instance of leaf 110 (e.g., leaf 110-1) is formed by a first portion of folded sheet 265 on a first side of the fold 266 and another instance of leaf 110 (e.g., leaf 110-2) is formed by a second portion of the folded sheet on a second side of the fold that opposes the first side.

In examples where the first signature includes a single folded sheet, binding-side edge 119 is formed by an exterior-side vertex 267 of fold 266 of the folded sheet that is shared by the pair of leaves (e.g., leaves 110-1 and 110-2). However, where the first signature includes a plurality of folded sheets (e.g., 265-1, 265-2, 265-M; where M represents any suitable quantity of folded sheets), these folded sheets can be nested within each other along their respective folds in which an inner-most folded sheet (e.g., 265-M) of the signature interfaces with thread of sewn binding 262 on an interior-side vertex (e.g., 268-M) of the fold, and an outer-most folded sheet (e.g., 265-1) of the first signature represented by binding-side edge 119 depicted in FIG. 2C with respect to leaf 110. Thus, thread of sewn binding 262 can gather and bind the first signature that forms a neighboring group of leaves of the first plurality of leaves 102 (and potentially one or more other leaves having a different pattern of tabs) within the bound collection.

In another example, one or more instances of leaf 110 (e.g., 110-1, 110-2, 110-M) of the first plurality of leaves 102 having the first pattern of tabs 112 and one or more instances of leaf 120 (120-1, 120-2, 120-M) of the second plurality of leaves 104 having the second pattern of tabs 112 can be formed from the same or common signature. As an example, prior to folding, gaps can be formed (e.g., cut, punched, molded, etc.) between tabs within sheet material such that when the sheet is folded into a signature there will be multiple patterns of tabs along the binding-side edge of the signature. The fold can then be trimmed or otherwise removed to separate the leaves into the first plurality of leaves and the second plurality of leaves having different patterns of tabs.

Leaf 120 of FIG. 2C can similarly represent one of the second plurality of leaves 104 as part of a second signature of one or more folded sheets. Thus, thread of sewn binding 262 can similarly gather and bind the second signature of a neighboring group of leaves of the second plurality of sheets 102 within the bound collection.

As previously described with reference to FIG. 1A, neighboring groups of leaves (e.g., as the first signature) of the first plurality of leaves 102 can be interspersed with neighboring groups of leaves (e.g., as the second signature) of the second plurality of leaves 104. Bound collection 100-2C can include any suitable quantity of signatures that are interspersed with each other. Within FIG. 2C, binding region 240C can represent a region of bound collection 100-C where thread of sewn binding 262 passes along interior-side vertex 268 of the inner-most folded sheet of each signature of the bound collection. All signatures of the bound collection can be bound together by thread of sewn binding 262 traversing binding-side edges 119 and 129 of exterior-side vertices of outer-most folded sheets and/or interior-side vertices of inner-most folded sheets of the signatures of the bound collection.

Also within FIG. 2C, a spine 108C is schematically depicted, which represents an example of spine 108 of FIG. 1A. Within the context of a sewn binding, spine 108C can include, as spine components, binding-side edges 119 and 129 and binding region 240C of leaves 101 and sewn binding 262 that binds each of the leaves within the bound collection (e.g., via their respective tabs). Spine 108C can further include, as additional components of the spine, one or more cover portions and/or intermediate components that couple the cover portions to the leaves and/or sewn binding 262.

FIG. 2D shows bound collection 100-2D as another example of bound collection 100 including a ring binding or spiral binding. In contrast to the edge binding techniques of FIGS. 2B and 2C, the ring binding or spiral binding of FIG. 2D can be referred to as a loose leaf binding. In this example, each tab of leaves 101 of bound collection 100-2D includes one or more apertures 270 (labeled in FIG. 2D with reference to example tab 124-1) through which a corresponding fastener 272 passes to bind that tab within the bound collection. Fastener 272 may take the form of a ring in the case of ring binding, or a portion of a continuous spiral in the case of spiral binding. Binding region 240D, as an example of binding region 240 of FIG. 2A, can include a region of each leaf or tabs thereof that is proximate to the binding-side edge and that incorporates each of apertures 270.

It will be understood that ring binding or spiral binding can include a single fastener (e.g., a single ring or single pass of a spiral portion) through an aperture of each tab, a double ring or double pass of a spiral portion through a pair of apertures of each tab, or other suitable quantity of rings or passes of a spiral portion through corresponding aperture(s) of each tab.

Tabs of first pattern of tabs 112 that are aligned with each other along binding axis 116 and spine axis 106 within a stack height dimension of the bound collection (into and out of the page in FIG. 2D) can be bound within the bound collection by the same fastener(s) that pass through apertures of each of those tabs. Similarly, tabs of second pattern of tabs 114 that are aligned with each other along binding axis 116 and spine axis 106 within a stack height dimension of the bound collection (into and out of the page in FIG. 2D) can be bound within the bound collection by the same fastener(s) that pass through apertures of each of those tabs. Loose leaf binding may also be accomplished using snap-ring binders, claw bindings, and/or other mechanisms.

For ring binding, each of fasteners 272 (e.g., rings) can be joined or otherwise coupled to each other by one or more structural components 274 (e.g., rigid or semi-rigid spanning members) represented schematically in FIG. 2D. As an example, structural components 274 can form part of a portion of a cover of the bound collection or other suitable components that couple each of the rings to each other and optionally to any cover of the bound collection. As another example, structural components 274 can form an extension of a ring or spiral portion in which a ring or spiral portion that passes through a tab of the first pattern of tabs 112 is continuous with a ring or spiral portion that passes through a neighboring tab of the second pattern of tabs 122. For spiral binding, each spiral portion of bound collection 100-2D can form part of a continuous spiral, which can be schematically represented by structural components 274 extending along spine axis 106.

Also within FIG. 2D, a spine 108D is schematically depicted, which represents an example of spine 108 of FIG. 1A. Within the context of ring binding or spiral binding, spine 108D can include, as spine components, binding-side edges 119 and 129 and binding region 240D of leaves 101, other leaves, fasteners 272 and structural components 274 that bind each of the leaves within the bound collection (e.g., via their respective tabs). Spine 108D can further include, as additional components of the spine, one or more cover portions and/or intermediate components that couple the cover portions to the leaves, the structural components 274, and/or fasteners 272.

FIG. 2E shows bound collection 100-2E as another example of bound collection 100 including a post binding or stapled binding. In contrast to the edge binding techniques of FIGS. 2B and 2C, and the loose leaf binding techniques of FIG. 2D, the post binding or stapled binding of FIG. 2E can be referred to as a side binding. In this example, each tab of leaves 101 of bound collection 100-2E includes one or more apertures 280 (labeled in FIG. 2E with reference to example tabs 124-1 and 114-2) through which a corresponding fastener 282 passes to bind that tab within the bound collection. Fastener 282 can take the form of a post fastener 282-1 as shown with respect to tab 114-2 and its apertures 280-1, or a staple fastener 282-2 shown with respect to tab 124-1 and its apertures 280-2. Staple fastener 282-2 passes through two instances of aperture 280-2 of tab 124-1, for example.

Each fastener 282 can pass through an aperture of each leaf that has a tab or other region of the leaf that is aligned along binding axis 116 and spine axis 106 within a stack height dimension of the bound collection (into and out of the page in FIG. 2E). For example, tabs of first pattern of tabs 112 that are aligned with each other along binding axis 116 and spine axis 106 within a stack height dimension of the bound collection (into and out of the page in FIG. 2D) can be bound within the bound collection by the same fastener(s) that pass through apertures of each of those tabs. Similarly, tabs of second pattern of tabs 114 that are aligned with each other along binding axis 116 and spine axis 106 within a stack height dimension of the bound collection (into and out of the page in FIG. 2D) can be bound within the bound collection by the same fastener(s) that pass through apertures of each of those tabs.

Tabs of the first plurality of sheets 102 and tabs of the second plurality of sheets 104 can be coupled to each other within the bound collection by one or more structural components 284 represented schematically in FIG. 2E. Structural components 284 can include one or more spanning members that extend along spine axis 106. Structural components 284 can be formed from a rigid, semi-rigid, or flexible material. As an example, structural components 284 can include a backing board or cover portion located on opposing sides of the bound collection of leaves. Alternatively or additionally, structural components 284 can include one or more leaves that feature a continuous binding-side edge along spine axis 106 that couple the first pattern of tabs 112 with the second pattern of tabs 122. These leaves can be interspersed with the leaves that feature binding-side edge tabs and/or can be located on opposing sides of the leaves featuring binding-side edge tabs. Side sewn bindings can alternatively be used in place of post or stapled bindings to provide a side binding for the bound collection. Binding region 240E in FIG. 2E is located proximate to binding-side edges 119 and 129, and includes the region containing apertures 280, fasteners 282, or thread used with side sewn binding.

Also within FIG. 2E, a spine 108E is schematically depicted, which represents an example of spine 108 of FIG. 1A. Within the context of post, stapled or side sewn bindings, spine 108E can include, as spine components, binding-side edges 119 and 129 and binding region 240E of leaves 101, other leaves, fasteners 282 and structural components 284 that bind each of the leaves within the bound collection (e.g., via their respective tabs). Spine 108E can further include, as additional components of the spine, one or more cover portions and/or intermediate components that couple the cover portions to the leaves, structural components 284 of the binding, and/or fasteners 282 or thread in the case of a side sewn binding.

FIG. 2F shows bound collection 100 including a clamped binding provided by a clamp 290 pressing on opposing sides of the bound collection. Opposing sides of clamp 290 can join with each other along a clamp spine or one or more other suitable structural components depicted schematically at 292. Clamp 290 in this example spans the tabs of the bound collection along spine axis 106. Binding region 240F extends from binding-side edges 119 and 129 to include regions of the leaves of the bound collection where the pair of clamps exert compressive force.

Also within FIG. 2F, a spine 108F is schematically depicted, which represents an example of spine 108 of FIG. 1A. Within a clamped binding, spine 108F can include, as spine components, binding-side edges 119 and 129 and binding region 240F of leaves 101, clamp 290 that binds each of the leaves within the bound collection (e.g., via their respective tabs). Spine 108F can further include, as additional components of the spine, one or more cover portions and/or intermediate components that couple the cover portions to the leaves, and clamp spine or other structural components 292.

Figure 3A:
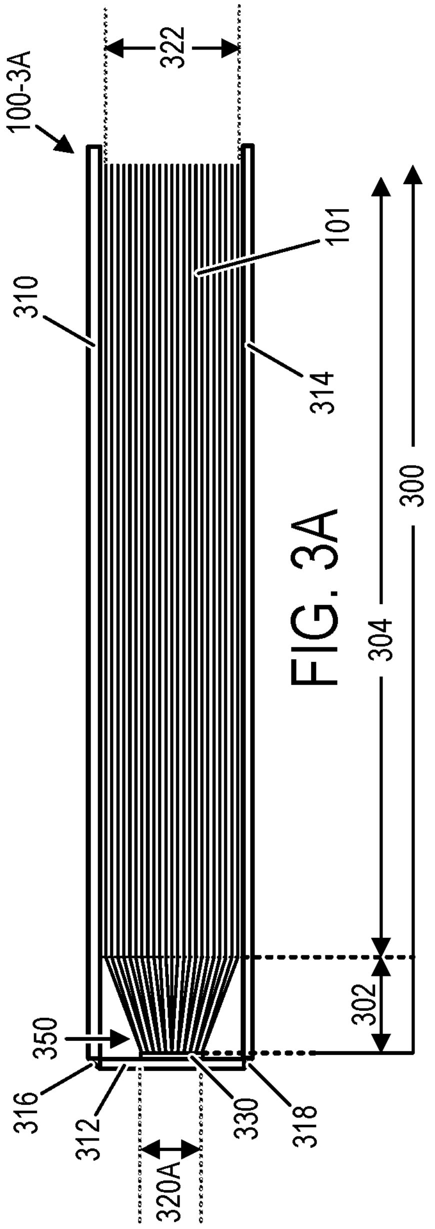
FIG. 3A schematically depicts an example of the bound collection of FIG. 1A as viewed along a spine axis in a closed state having a binding stack height that is less than a text block stack height.

FIG. 3A schematically depicts a bound collection 100-3A in a closed state as an example of bound collection 100 of FIG. 1A. In FIG. 3A, bound collection 100-3A is viewed along spine axis 106. In this example, leaves 101 are edge bound at 330A (e.g., by an adhesive as described with reference to FIG. 2B) within bound collection 100-3A and have a binding stack height 320A that is less than a text block stack height 322. It will be understood that other suitable bindings can be used, including edge binding, off-edge binding, and loose leaf binding, as well as the various binding techniques disclosed herein.

Each leaf of bound collection 100-3A extends from its binding-side edge (and any other binding region proximate to the binding-side edge) to an unbound region 300 represented schematically in FIG. 3A. Unbound region 300 includes a first unbound region 302 and a second unbound region 304. First unbound region 302 can refer to unbound tab region 250 for leaves that feature binding-side edge tabs. Additionally or alternatively, unbound region 302 can refer to an unbound region of reduced cross section 621 described in further detail with reference to FIGS. 6A and 6B.

The reduction in binding stack height 320A relative to text block stack height 322 can be achieved through use of the previously described tabs of FIGS. 1A and 2A. For example, FIG. 3A depicts this reduction in binding stack height 320A within a region 350 of reduced cumulative leaf thickness that corresponds to unbound tab region 250 and binding region 240 of FIG. 2A. Alternatively or additionally, this reduction in binding stack height 320A relative to text block stack height 322 can be achieved through use of leaves having a reduced cross section along a binding-side edge of the leaves to provide region 350 of reduced cumulative leaf thickness as described, for example, with reference to FIGS. 6A and 6B. Thus, region 350 of reduced cumulative leaf thickness can include first unbound region 302 and any binding region between first unbound region 302 and the binding-side edge of the leaves. In at least some examples, first unbound region 302 can be larger than any binding region (inclusive of the binding-side edge) between first unbound region 302 and the binding-side edge of the leaves.

As an example, binding stack height 320A can be approximately half of text block stack height 322 through the use of the first and second patterns of tabs that are offset from each other. However, binding stack height 320A may be less than or greater than half of text block stack height 322 in other examples. Reduction in the binding stack height can improve wrap around functionality performance of the bound collection for at least some binding techniques.

Bound collection 100-3A in this example further includes a cover formed by a front-side cover portion 310, a spine cover portion 312, and a rear cover portion 314. Spine cover portion 312 is coupled to front-side cover portion 310 by a first hinge 316, and is coupled to rear-side cover portion 314 by a second hinge 318.

Figure 3B:
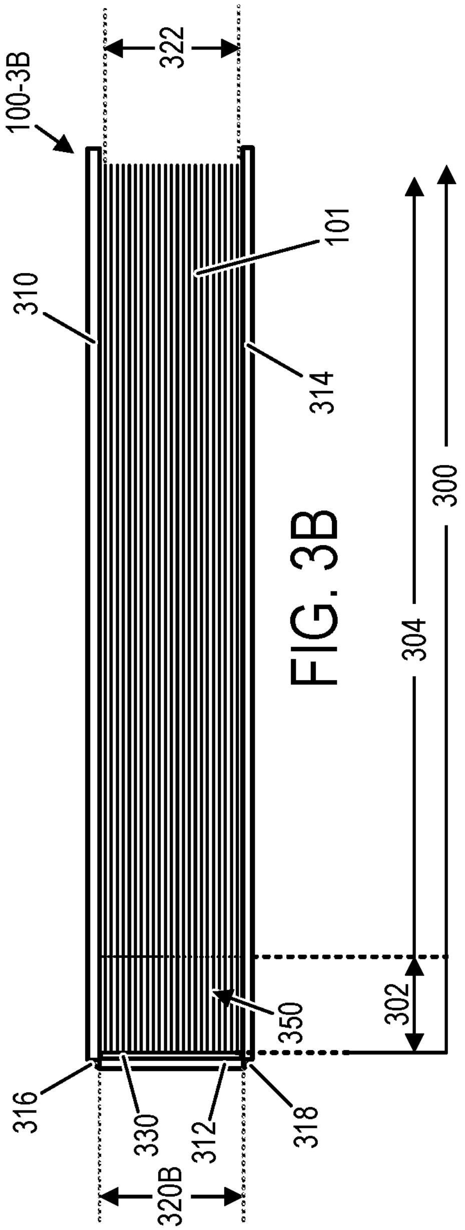
FIG. 3B schematically depicts another example of the bound collection of FIG. 1A as viewed along a spine axis in a closed state having a binding stack height that is equal or similar to a text block stack height.
Figure 8A:
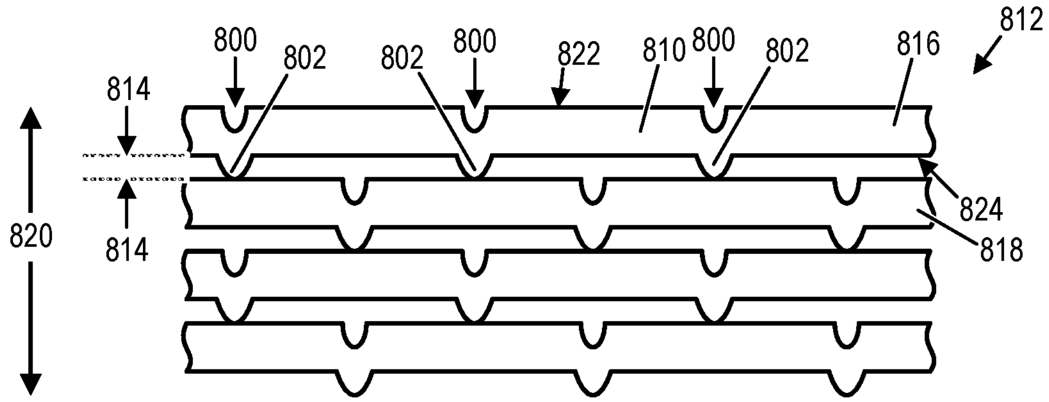
FIG. 8A schematically depicts the use of dimpling along a binding-side edge of a collection of leaves to provide and maintain spacing between the edges in a dimension of a binding stack height.
Figure 8B:
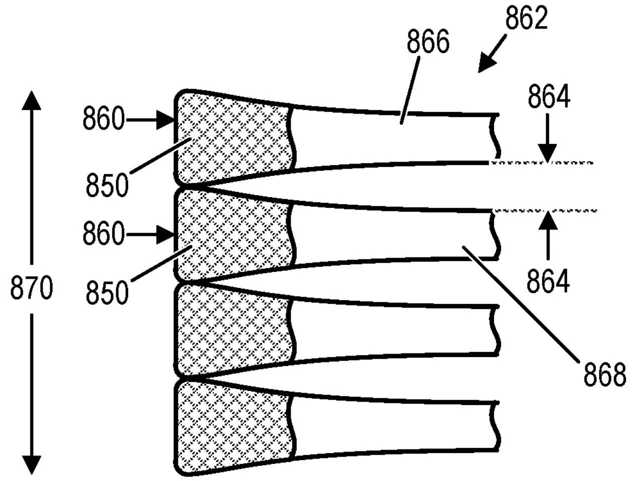
FIG. 8B schematically depicts the use of fraying along a binding-side edge of a collection of leaves to provide and maintain spacing between the edges in a dimension of a binding stack height.

FIG. 3B schematically depicts a bound collection 100-3B in a closed state as an example of bound collection 100 of FIG. 1A. In FIG. 3B, bound collection 100-3B is viewed along spine axis 106 as similarly shown in FIG. 3A. However, in this example, leaves 101 of bound collection 100-3B are edge bound at 330B (e.g., by an adhesive as described with reference to FIG. 2B) and have a binding stack height 320B that is equal to or approximately equal to text block stack height 322 even though region 350 of reduced cumulative leaf thickness is present within bound collection 100-3B. FIGS. 8A and 8B describe techniques that can be used to set the binding stack height at any suitable height relative to text block stack height, thereby supporting a variety of form factors. Bound collection 100-3B in this example further includes the cover previously described with reference to FIG. 3A. FIG. 3B further depicts unbound region 300 including first unbound region 302 and second unbound region 304 previously described with reference to FIG. 3A. It will be understood that bound collection 100-3B can include any of the leaves disclosed herein that provide region 350 of reduced cumulative leaf thickness, including leaves with binding-side edge tabs and/or leaves having a reduced cross-section (e.g., as described with reference to FIGS. 6A and 6B).

Figure 3C:
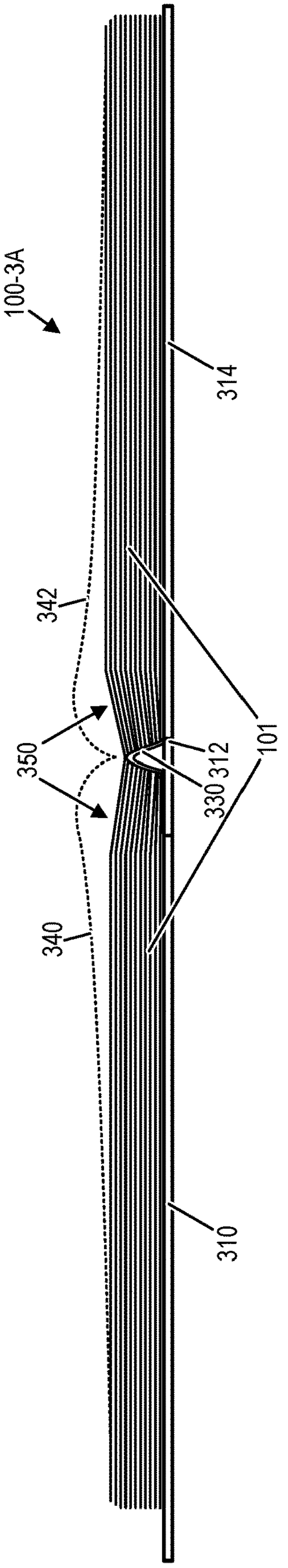
FIG. 3D schematically depicts an example of the bound collection of FIG. 3A as viewed along the spine axis in an open state of 360 degrees.
FIG. 3E schematically depicts an example of the bound collection of FIG. 1A as viewed along a spine axis in a closed state utilizing a ring binding and having a binding stack height that is less than a text block stack height.

FIG. 3C schematically depicts an example of bound collection 100-3A of FIG. 3A as viewed along the spine axis in an open state of 180 degrees. For example, cover portions 310 and 314 reside within the same plane or at least parallel to each other with their outer faces facing in the same direction in FIG. 3C. Furthermore, within FIG. 3C, bound collection 100-3A is depicted exhibiting improved lay flat functionality and performance due, at least in part, to the region 350 of reduced cumulative leaf thickness. Within FIG. 3C, broken lines indicated at 340 and 342 schematically represent (as a prophetic or hypothetical example) an effective positioning of the same collection of leaves 101 in the absence of the region 350 of reduced cumulative leaf thickness due, at least in part, to increased bulging of the leaves.

Figure 3D:
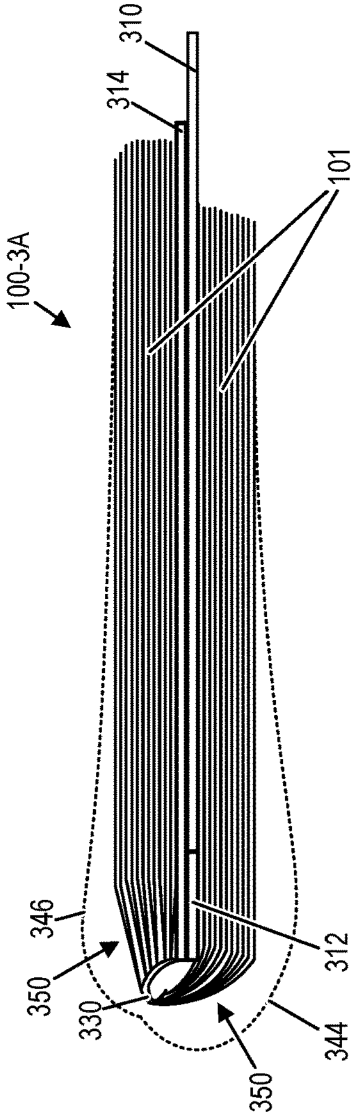

FIG. 3D schematically depicts an example of the bound collection 100-3A of FIG. 3A as viewed along the spine axis in an open state of 360 degrees. For example, outer faces of front-side cover portion 310 and rear-side cover portion 314 face each other in the open state of 360 degrees. Furthermore, within FIG. 3D, bound collection 100-3A is depicted exhibiting improved lay flat and wrap around functionality and performance due, at least in part, to the region 350 of reduced cumulative leaf thickness. Within FIG. 3D, broken lines indicated at 344 and 346 represent (as a prophetic or hypothetical example) an effective positioning of the same collection of leaves 101 in the absence of the region 350 of reduced cumulative leaf thickness due, at least in part, to increased bulging of the leaves.

While FIGS. 3C and 3D depict examples of how the region of reduced cumulative leaf thickness 350 can provide improved functionality and performance with respect to bound collection 100-3A. It will be understood that improvements in functionality and performance can also be achieved when this region of reduced cumulative leaf thickness 350 is used with bound collection 100-3B of FIG. 3B that exhibits binding stack height 320B that is equal or approximately equal to text block stack height 322.

Figure 3E:
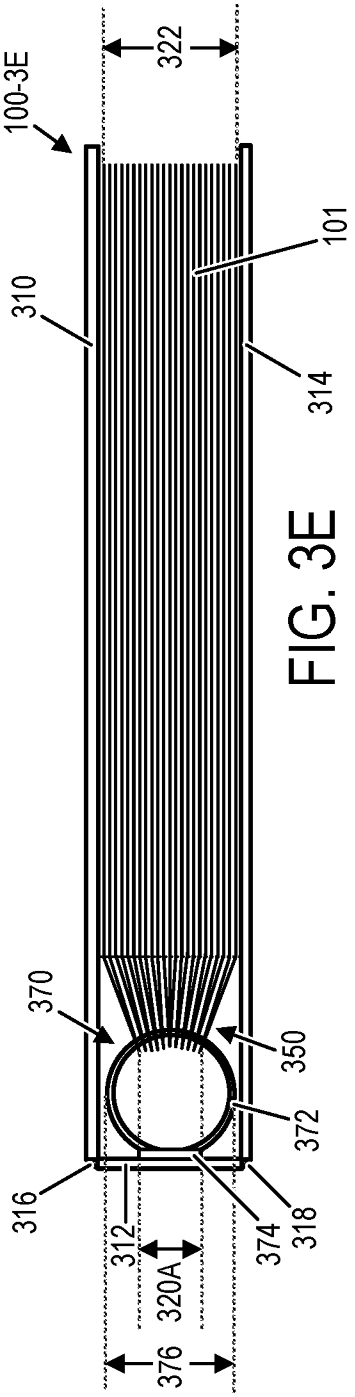

FIG. 3E schematically depicts a bound collection 100-3E in a closed state as an example of bound collection 100 of FIG. 1A using the binding techniques of FIG. 2D. Within FIG. 3E, bound collection 100-3E is similarly viewed along the spine axis as depicted in FIG. 3A in which leaves 101 have binding stack height 320A that is less than text block stack height 322 due, at least in part, to inclusion of the region of reduced cumulative leaf thickness 350 of leaves 101. However, in contrast to the adhesive binding of FIG. 3A, leaves 101 are bound within bound collection 100-3E by a ring binding 370, which is an example of the previously described ring binding of FIG. 2D. Ring binding 370 includes ring fasteners 372 that is/are coupled to previously described spine cover portion 312 either directly or by one or more intermediate components 374 (e.g., one or more structural components 274 of FIG. 2D) represented schematically in FIG. 3E.

In this example, ring fasteners 372 are sized with an outer dimension 376 that is roughly parallel to text block stack height 322 such that the outer dimension (e.g., a diameter or outer profile) of ring fasteners 372 is less than (or alternatively equal to) the text block stack height. By sizing outer dimension 376 of ring fasteners 372 to be less than (or equal to) the text block stack height 322, a bound collection (e.g., bound collection 100-3E) can exhibit improved durability due to the ring fasteners being less likely to collide with or undergo forces from other objects, and can be more protected from snagging or deformation caused by the mass and/or text block stack height of the bound collection of leaves. Furthermore, a bound collection having ring fasteners that are sized such that outer dimension 376 is equal to or less than the text block stack height 322, enables the bound collection to be more convenient to handle, store, and carry due, at least in part, to the ability to utilize a cover assembly that provides an overall rectangular form factor as viewed along the spine axis. For example, this rectangular form factor can allow multiple bound collections to be stored face to face or stacked with front and rear cover portions (e.g., 310 and 314) remaining parallel to each other while in contact with their respective bound collection of leaves and while also maintaining spine cover portions (e.g., 312) in an orientation that is orthogonal to the faces of the front and rear cover portions.

While the region of reduced cumulative leaf thickness 350 described with reference to FIGS. 3A-3E can incorporate leaves having binding-side edge tabs located along a binding-side edge, leaves that feature a reduced cross section along the binding-side edge as described with reference to FIGS. 6A and 6B can be alternatively or additionally used to achieve the region of reduced cumulative leaf thickness 350.

Figure 4:
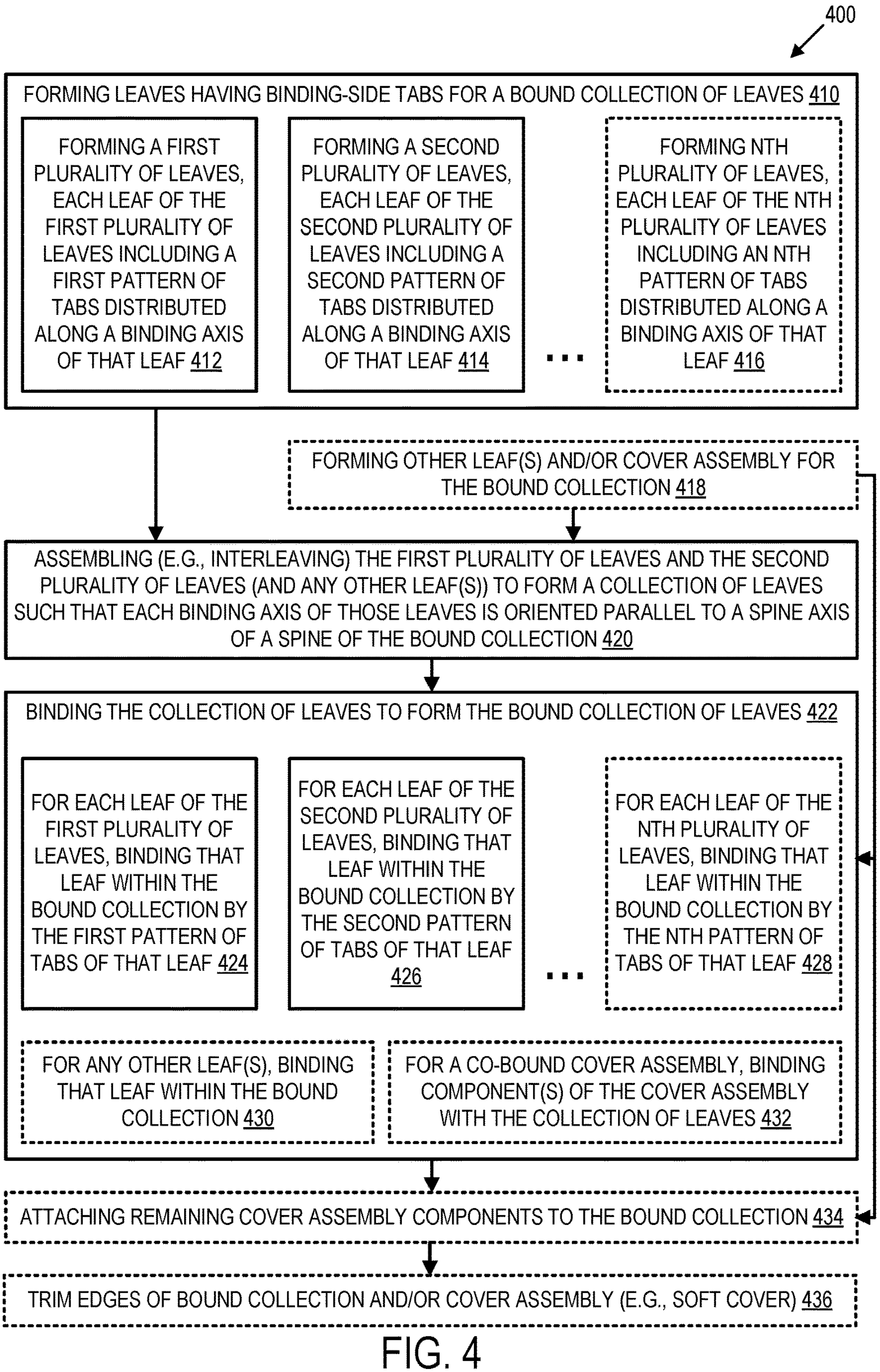
FIG. 4 is a flow diagram depicting an example method of manufacturing a bound collection of leaves, such as the bound collection of FIG. 1A.

FIG. 4 is a flow diagram depicting an example method 400 of manufacturing a bound collection of leaves having a spine. The bound collection of leaves manufactured by method 400 can include bound collection 100 of FIG. 1A, as an example.

At 410, the method includes forming leaves having binding-side edge tabs for a bound collection of leaves. As previously described with reference to FIGS. 1A and 2A, a bound collection of leaves can have at least a first plurality of leaves and a second plurality of leaves having different patterns of tabs that extend to the binding-side edge of the leaves. In another example, a bound collection of leaves can include leaves having three or more different patterns of tabs that extend to the binding-side edge of the leaves.

Within method 400, a quantity of different patterns of tabs of the bound collection can be described by the variable "N", thereby representing any suitable quantity of tab patterns. Leaves formed as part of operation 410 can use a variety of techniques including reductive techniques such as cutting, punching, grinding, etching, etc. of leaf material, and/or additive techniques such as molding, material deposition, 3D printing, bonding multiple materials, etc. Additional examples of forming leaves having tabs along a binding-side edge are described in further detail with reference to FIGS. 5A and 5B.

As part of operation 410, at 412, the method includes forming a first plurality of leaves. Each leaf of the first plurality of leaves includes a first pattern of tabs distributed along a binding axis of that leaf. Each tab of the first pattern of tabs can extend to a binding-side edge of its leaf. As an example, the first plurality of leaves formed at operation 412 can refer to the first plurality of leaves 102 of FIG. 1A, each leaf having a first pattern of tabs 112 that extend to binding-side edge 119 of that leaf.

Furthermore, as part of operation 410, at 414, the method includes forming a second plurality of leaves. Each leaf of the second plurality of leaves includes a second pattern of tabs distributed along a binding axis of that leaf. The second pattern of tabs can differ from the first pattern of tabs formed by operation 412 along some or all of the spine axis when bound together as a collection. Each tab of the second pattern of tabs can extend to a binding-side edge of its leaf. As an example, the second plurality of leaves formed at operation 414 can refer to the second plurality of leaves 104 of FIG. 1A, each leaf having a second pattern of tabs 122 that extend to binding-side edge 129 of that leaf.

However, in another example, a first plurality of leaves having a first pattern of tabs and a second plurality of leaves having a second pattern of tabs can be formed from the same or common signature. As an example, gaps can be formed (e.g., cut, punched, molded, etc.) between tabs within sheet material. The sheet can be folded into a signature in which multiple patterns of tabs are along the binding-edge side of the signature. The fold can then be trimmed or otherwise removed to separate the leaves into the first plurality of leaves and the second plurality of leaves having different patterns of tabs.

and then the sheet material can be folded onto itself one or more times to define individual leaves such that tabs located on one side of a fold that does not define a binding-side edge of the leaves are offset from tabs located on another side of the fold in a dimension orthogonal to the binding-side edge. The fold can then be trimmed or otherwise removed to separate the leaves into the first plurality of leaves and the second plurality of leaves having different patterns of tabs.

For each additional pattern of tabs that differs from the first and second patterns formed as part of operations 412 and 414, operation 416 can be performed for the Nth pattern of tabs. For example, at 416, the method includes forming an Nth plurality of leaves. Each leaf of the Nth plurality of leaves includes an Nth pattern of tabs distributed along a binding axis of that leaf. Each pattern of tabs can differ from each other pattern of tabs along at least a portion of the spine axis when bound as a collection. Each tab of these various patterns can extend to a binding-side edge of its leaf.

Optionally, at operation 418, the method can include forming one or more other leaves that do not feature binding-side edge tabs and/or a cover assembly for the bound collection. As an example, some bound collections include leaves that do not feature binding-side edge tabs along a binding-side edge of those leaves. A cover assembly can include one or more portions that form a cover of the bound collection as well as one or more intermediate components that are used to couple the cover to the bound collection. As an example, intermediate components of a cover assembly can include one or more anchor portions, a mull, etc. Fly sheets or similar components can contribute to coupling the bound collection to the cover portions. Leaves and/or the cover assembly formed as part of operation 418 can use a variety of techniques including reductive techniques such as cutting, punching, grinding, etching, etc. of leaf or cover assembly materials; additive techniques such as molding, material deposition, 3D printing, bonding multiple materials, etc.; and/or forming processes such as folding, scoring, creasing, etc.; and/or various other bonding or coupling processes.

At 420, the method includes assembling the first plurality of leaves and the second plurality of leaves to form a collection of leaves such that each binding axis of the first plurality of leaves and the second plurality of leaves is oriented parallel to a spine axis of the spine. Operation 420 can be performed for any additional leaves and/or cover assembly formed at operations 416 and 418, including the Nth plurality of leaves.

The leaves can be assembled at operation 420 according to a bound order. As an example, the bound order can include the first plurality of leaves formed at operation 412 interleaved with at least the second plurality of leaves formed at operation 414. Additionally, the bound order can include each of the Nth plurality of leaves formed at operation 416 interleaved with the previously described first plurality of leaves and the second plurality of leaves.

As previously described with reference to FIGS. 1A-1C, the bound order can include a repeating sequence of a subset of the first plurality of leaves followed by a subset of the second plurality of leaves. As an example, the subset of the first plurality of leaves can consist of one leaf of the first plurality of leaves, and the subset of the second plurality of leaves can consist of one leaf of the second plurality of leaves to provide a repeating sequence such as "ABABAB". Within the context of three different patterns of tabs being used, this repeating sequence can include "ABCABCABC", where "C" represents a leaf of a third plurality of leaves. It will be understood that the bound order can include variations in any sequence and other types of leaves from operation 418 can be interspersed with leaves featuring binding-side edge tabs.

As another example, the subset of the first plurality of leaves can include two or more leaves of the first plurality of leaves, and the subset of the second plurality of leaves can include two or more leaves of the second plurality of leaves. A repeating sequence of "AABBAABBAABB" can be assembled, as an example. Within the context of three different patterns of tabs being used, this repeating sequence can instead be "AABBCCAABBCCAABBCC", where "C" again represents a leaf of a third plurality of leaves. It will be understood that subsets of neighboring leaves having the same tab pattern within the bound order can include three, four, five, six, seven, eight, nine, ten or more leaves.

At 422, the method includes binding the collection of leaves to form the bound collection of leaves. Binding performed at 422 can include the use of one or more binding techniques including adhesive binding, sewn binding, ring binding (including snap ring, double loop, etc.), spiral binding, post binding, stapled binding, clamped binding, etc.

As an example, binding can be performed at operation 422 by, for each leaf of the first plurality of leaves, binding that leaf within the bound collection by the first pattern of tabs of that leaf at 424, and for each leaf of the second plurality of leaves, binding that leaf within the bound collection by the second pattern of tabs of that leaf at 426. For each of the Nth plurality of leaves, binding can be performed at operation 428 by, for each leaf of the Nth plurality of leaves, binding that leaf within the bound collection by the Nth pattern of tabs of that leaf.

Where other leaves to be bound do not have binding-side edge tabs formed at operation 418, the method can include binding these other leaves by their binding-side edge or a binding region in a vicinity of the binding-side edge within the bound collection at 430. Furthermore, where components of a cover assembly formed at operation 418 are to be co-bound with the collection of leaves assembled at operation 420, the method at 432 can include binding the one or more components of the cover assembly with the collection of leaves. As an example, an adhesive can be applied to bind the leaves of the collection with cover portions and/or intermediate components of the cover assembly. At 434, any remaining cover components can be attached to the bound collection. For example, cover portions can be attached to intermediate components of the cover assembly that were co-bound with the collection of leaves as part of operation 432.

In the case of adhesive binding, the collection of leaves can be clamped and adhesive can be applied along the binding-side edge of the tabs and any leaves that do not feature binding-side edge tabs. In at least some examples, adhesive can be applied so that the adhesive does not entirely fill the gaps between tabs to maintain an unbound tab region (e.g., unbound tab region 250 of FIG. 2B) in the bound collection. Furthermore, in at least some examples, adhesive penetration beyond the binding-side edge of the leaves can be minimized or reduced to the extent possible to increase lay flat and wrap around functionality of the bound collection. As described with reference to FIGS. 3A and 3B, binding stack height can be varied between less than the text block stack height and roughly equal to the text block stack height. Clamping force used on the binding region as part of the process of applying adhesive can be increased to reduce binding stack height or reduced to increase binding stack height to a suitable level for a given application.

In the case of ring binding or post binding, one or more apertures can be formed (e.g., punched) in each tab of each leaf (and any other leaves or cover assembly components) prior to or after assembling the leaves into the collection at operation 420 to accommodate any ring, spiral, or post components that are used to secure the leaf within the bound collection. It will be understood that such apertures can be formed within a stack of any suitable quantity of leaves.

In still further examples, binding-side edge tabs can be formed in a bound collection of leaves after some or all of the binding operations 424-428 are performed. As an example, a collection of leaves can be bound using an adhesive binding or a sewn binding, followed by removing portions of the bound collection corresponding to the gaps located between the tabs.

Thus, it will be understood that the operations described with reference to FIG. 4 can be performed concurrently (e.g., 424 and 426) or in a different order, depending on the type of binding and cover assembly. As an example, for bindings that feature apertures for fasteners such as ring, spiral, and post bindings, these apertures can be formed (e.g., punched, drilled, etc.) in the leaves as part of operations 410 and/or 418 prior to assembling the collection at operation 420 or after the assembling of the collection of leaves at operation 420. Furthermore, in at least some examples, these apertures can be formed in the leaves as part of an additive process, such as molding, material deposition, 3D printing, etc. As another example, at least some cover assemblies can include components that are co-bound as part of operation 432, and additional components that are attached as part of operation 434.

In at least some examples, at 436, edges of the bound collection of leaves and/or the cover assembly can be trimmed, such as in the case of soft bound books.

Figure 5A:
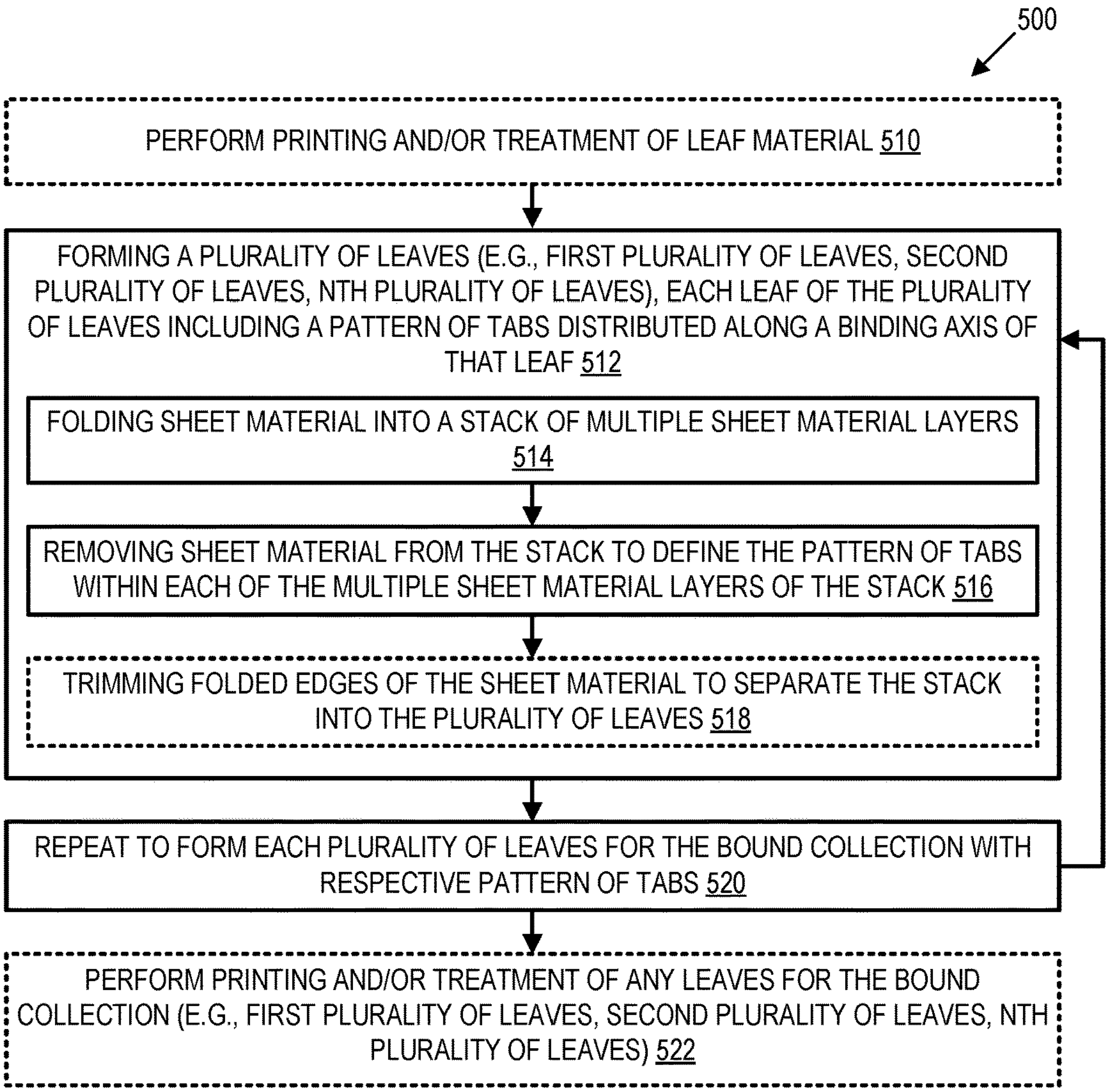
FIG. 5A is a flow diagram depicting an example method 500 of forming a plurality of leaves for a bound collection, such as the bound collection of FIG. 1A.

FIG. 5A is a flow diagram depicting an example method 500 of forming a plurality of leaves for a bound collection. Method 500 can be used in combination with previously described method 400, as an example.

At 510, printing and/or treatment of sheet material can optionally be performed prior to folding, cutting, and trimming the sheet material into leaves.

At 512, the method includes forming a plurality of leaves in which each leaf includes a pattern of tabs distributed along a binding axis of that leaf. Operation 512 can refer to any of the previously described leaf forming operations 410, 412, 414, and 416 that are used to form a first plurality of leaves (e.g., 102 of FIG. 1A), a second plurality of leaves (e.g., 104 of FIG. 1A), or an Nth plurality of leaves, each having a respective pattern of tabs.

As part of operation 512, the method can include folding the sheet material into a stack of multiple sheet material layers at 514. As an example, the sheet material can be folded one or more times to obtain the stack of multiple sheet material layers. As an example, a multi-leaf signature can be created by folding sheet material into any suitable quantity of sheet layers.

At 516, the method can include removing sheet material of the stack to define the pattern of tabs within each of the multiple sheet material layers of the stack. Removal of sheet material can include cutting, grinding, punching, etc. As an example, cutting performed at operation 516 can include use of a die cutter that defines the pattern of tabs. In at least some examples, two or more different patterns of tabs can be cut using the same die cutter (or tooling) or two instances of the same die cutter shape (or tooling shape) by varying an edge alignment or offset of the stack to a location where the cut is performed. However, in other examples, each pattern of tabs may use a different die cutter or different set of tooling that is specific to that pattern.

In at least some examples, the pattern of tabs can be cut within sheet material prior to folding at operation 514. As an example, for a pair of leaves that are to have the same pattern of tabs and that are to share a binding-side edge along a fold of a sheet, the tabs of this pair of leaves can be formed by forming openings (e.g., e.g., cutting using a die cutter or otherwise removing material) in the sheet material that correspond to the gaps located between the tabs such that the gaps have a width dimension that correspond to roughly twice the tab width (e.g., tab width 212 or 222 of FIG. 2A) of an individual leaf. During a subsequent folding operation at 514, the sheet material can be folded to create a fold at least along a boundary between the pair of leaves that is orthogonal to the width or depth dimension of the gaps. This fold can form a binding-side edge (e.g., 119 or 129) that is shared between the pair of leaves. In at least some examples, multiple, different tab patterns can be cut in a sheet prior to folding. Following folding of the sheet, the resulting signature (e.g., an 8-leaf signature) may yield a sequence of sheets represented by "AABBBBAA" or "ABBAABBA", where "A" represents a leaf having a first pattern of tabs and "B" represents a leaf having a second patter of tabs that differs from the first pattern of tabs.

At 518, the method optionally includes trimming folded edges of the sheet material to separate the stack into the plurality of leaves. As an example, where the sheet material is folded a single time at 514 to create a stack of two sheet material layers, trimming may not be performed at 518 if the folded edge is to be retained and shared between two leaves as the binding-side edge of the tabs. As another example, trimming of the binding-side edge may not be performed where a group of leaves are to remain as a signature for binding (e.g., by the sewn binding of FIG. 2C). In this example, any folded edges that are not to be retained within the signature (e.g., edges of the leaves that are not along the binding-side edge) may be trimmed. The trimming performed at operation 518 can utilize grinding, cutting or other suitable trimming technique.

At 520, operations 510-518 can be repeated for each plurality of leaves for the bound collection with the respective pattern of tabs for that plurality of leaves.

At 522, printing and/or treatment of any leaves for the bound collection can optionally be performed, which can include the first plurality of leaves, second plurality of leaves, and Nth plurality of leaves previously described with reference to method 400 of FIG. 4. In at least some examples, printing and/or treatment can be performed at 522 before or after assembling the leaves into a collection as part of operation 420 of FIG. 4.

Figure 5B:
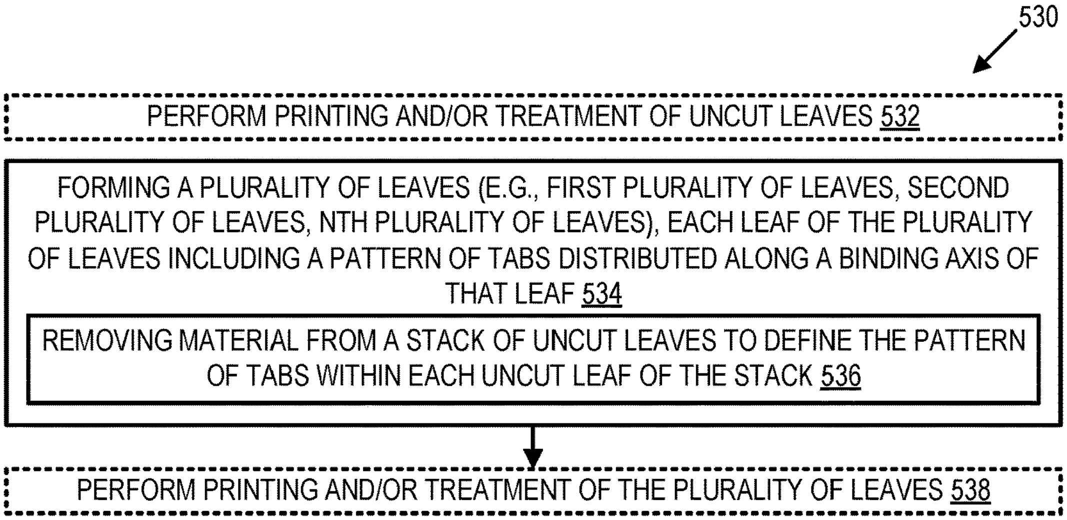
FIG. 5B is a flow diagram depicting another example method 530 of forming a plurality of leaves for a bound collection, such as the bound collection of FIG. 1A.

FIG. 5B is a flow diagram depicting another example method 530 of forming a plurality of leaves for a bound collection. Method 530 can also be used in combination with previously described method 400, as an example. In contrast to method 500 of FIG. 5A, a pattern of tabs can be formed in leaves that are pre-sized without folding or trimming of folded edges. At 532, printing and/or treatment of uncut leaves can optionally be performed prior to cutting the pattern of tabs into the leaves. At 532, the method includes forming a plurality of leaves in which each leaf includes a pattern of tabs distributed along a binding axis of that leaf. Operation 532 can refer to any of the previously described leaf forming operations 410, 412, 414, and 416 that are used to form a first plurality of leaves (e.g., 102 of FIG. 1A), a second plurality of leaves (e.g., 104 of FIG. 1A), or an Nth plurality of leaves, each having a respective pattern of tabs. As part of operation 536, the method can include removing material from a stack of uncut leaves to define the pattern of tabs within each uncut leaf of the stack. Any of the previously described techniques of operation 516 of FIG. 5A can be used to remove material from the stack of leaves to create the pattern of tabs within the stack. Alternatively, leaves can be individually cut.

Operations 532, 534, and 536 can be repeated for each plurality of leaves to create respective patterns of tabs in those leaves, such as previously described with reference to operation 520 of FIG. 5A.

At 538, printing and/or treatment of any leaves for the bound collection can optionally be performed after cutting, which can include the first plurality of leaves, second plurality of leaves, and Nth plurality of leaves previously described with reference to method 400 of FIG. 4. In at least some examples, printing and/or treatment can be performed at 538 before or after assembling the leaves into a collection as part of operation 420 of FIG. 4.

Figure 6A:
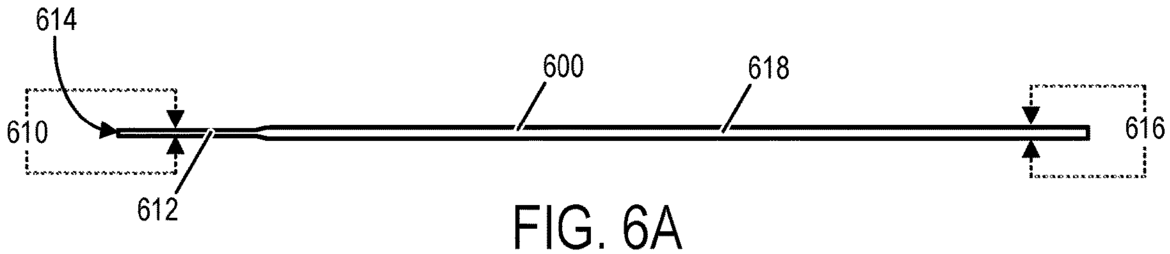
FIGS. 6A and 6B schematically depict an example leaf featuring a reduced cross section along a binding-side edge of the leaf.
Figure 6B:
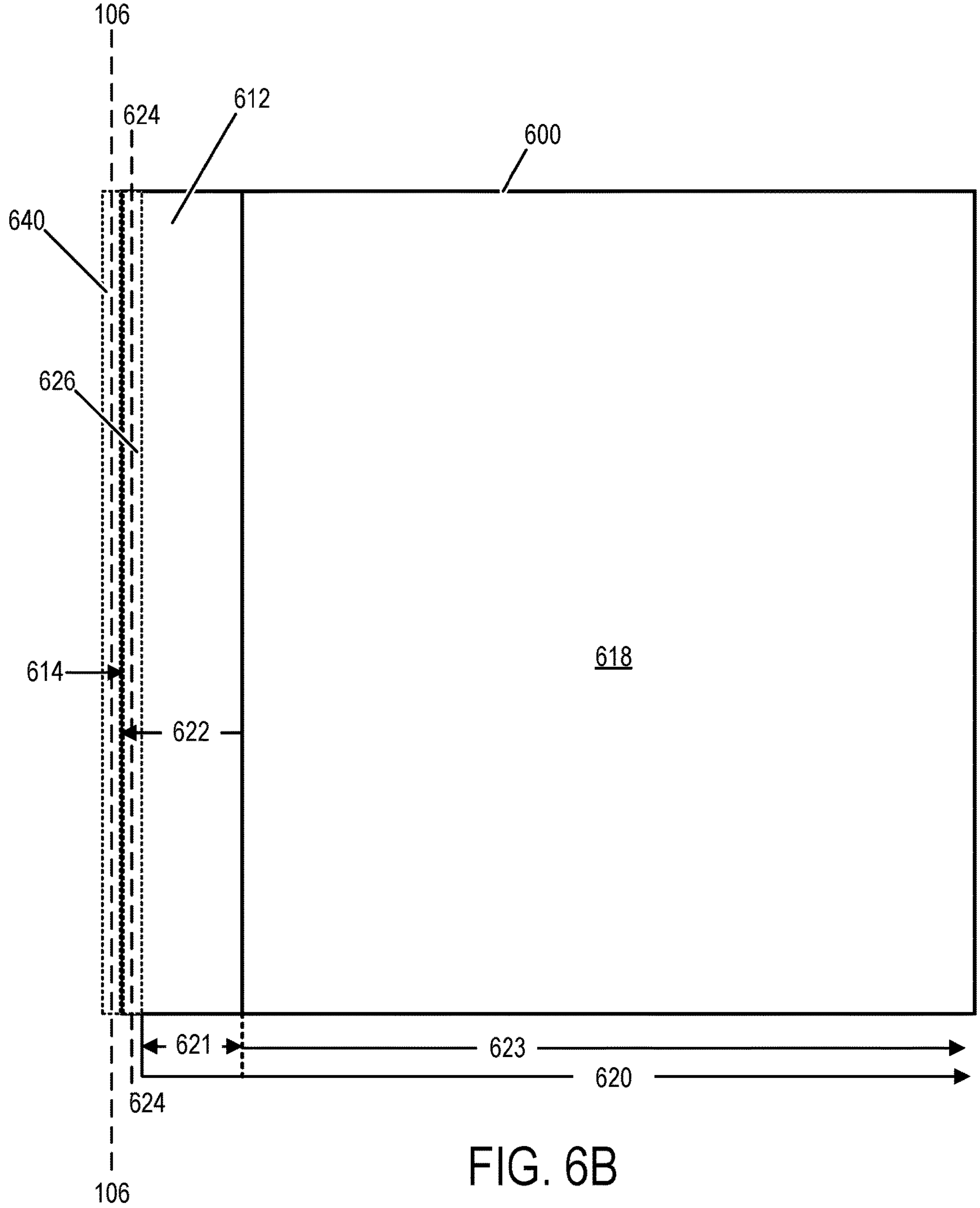

FIGS. 6A and 6B schematically depict an example leaf 600 featuring a reduced cross section 610 (leaf thickness dimension) within a reduced cross section region 612 along a binding-side edge 614 as compared to a cross section 616 of a text block region 618 of the leaf. Leaf 600 can be used in a bound collection (e.g., bound collection 100 of FIG. 1A) in place of any or all of the leaves disclosed herein that feature binding-side edge tabs. In this example, reduced cross section 610 extends from within an unbound region 620 to binding-side edge 614 in a direction 622 that is orthogonal to binding axis 624 of the leaf and to a spine axis (e.g., 106) of a bound collection within which the leaf is bound.

Accordingly, in bound collection 100, when using leaf 600 of FIGS. 6A and 6B, each leaf of a plurality of leaves of the bound collection can similarly have the reduced cross section 610 that extends from within unbound region 620 to binding-side edge 614 in the direction orthogonal to spine axis 106. Within FIG. 6B, unbound region 620 of leaf 600 includes unbound region of reduced cross section 621 and an unbound text block region 623. Unbound region of reduced cross section 621 includes the portion reduced cross section region 612 that is unbound and resides outside of any binding region of the leaf (e.g., 626), including any of the previously described example binding regions of FIGS. 2A-2F.

In at least some examples, each instance of leaf 600 within the bound collection can be formed from a unitary piece of leaf material, such as paper or other suitable material disclosed herein. Furthermore, in at least some examples, each leaf of the plurality of leaves can be edge bound within the bound collection along binding-side edge 614 by an adhesive or other suitable binding technique. For example, spine 640 can include adhesive that binds multiple instances of leaf 600 together along binding-side edge 614. Alternatively or additionally, binding can take place within binding region 626 of leaf 600 located proximate binding-side edge 614 provided that at least a portion of reduced cross section region 612 remains unbound and beyond the binding region. When multiple instances of leaf 600 are bound to form a bound collection of leaves, the bound collection can take the form of bound collection 100 depicted in FIGS. 3A-3E.

Figure 7:
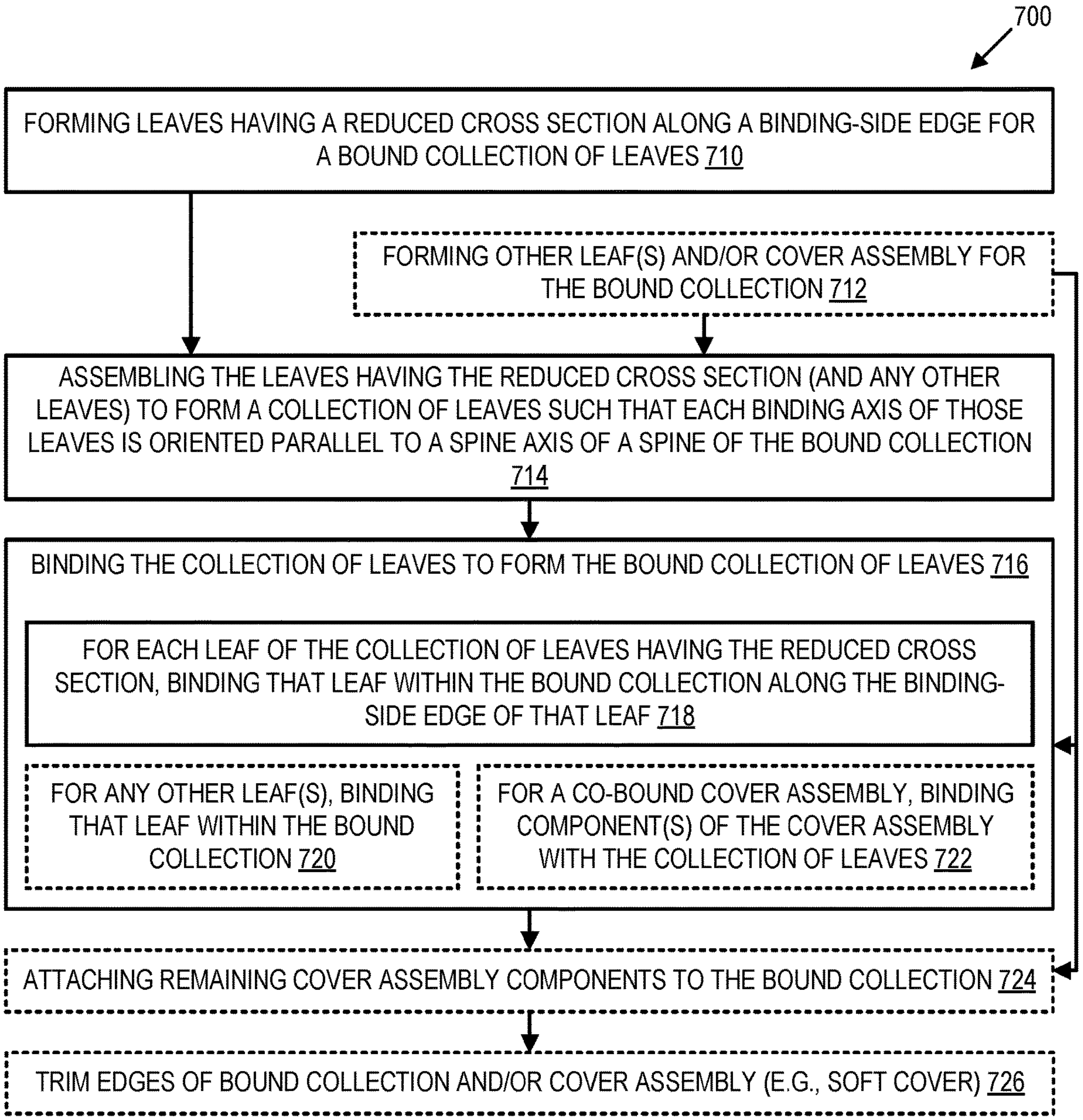
FIG. 7 is a flow diagram depicting an example method of manufacturing a bound collection of leaves that includes one or more leaves of FIGS. 6A and 6B.

FIG. 7 is a flow diagram depicting an example method 700 of manufacturing a bound collection of leaves having a spine that includes one or more of leaves 600 of FIGS. 6A and 6B.

At 710, the method includes forming leaves having a reduced cross section along a binding-side edge for a bound collection of leaves. As an example, multiple instances of leaf 600 of FIGS. 6A and 6B can be formed by compressing sheet material from which individual leaves are formed or by compressing a stack of leaves. For example, a clamp may be used to compress individual leaves or groups of leaves within a region located along a binding-side edge. As additional examples, the reduced cross section can be achieved by removing material from each leaf or sheet material by cutting, grinding, etching, etc., or by forming the leaves by additive techniques such as molding, material deposition, 3D printing, bonding multiple materials, etc. In at least some examples, sheet material can be formed having the reduced cross section that is then cut into multiple leaves having that reduced cross section along their respective binding-side edges.

At 712, the method includes forming any other leaves and/or cover assembly components for the bound collection. Operation 712 can include any of the examples previously described with reference to operation 418 of FIG. 4.

At 714, the method includes assembling the leaves having the reduced cross section and any other leaves formed at operation 712 to form a collection of leaves such as that each binding axis of those leaves is orientated parallel to each other and to a spine axis of a spine of the bound collection.

At 716, the method includes binding the collection of leaves to form the bound collection of leaves. Binding performed at 716 can include the use of one or more of the previously described binding techniques including adhesive binding, sewn binding, ring binding (including snap ring, double loop, etc.), spiral binding, post binding, stapled binding, clamped binding, etc. As an example, binding can be performed at operation 716 by, for each leaf of the collection of leaves having the reduced cross section, binding that leaf within the bound collection along the binding-side edge of that leaf.

Where other leaves are to be bound that are formed at operation 712, the method can include binding these other leaves by their binding-side edge within the bound collection at 720. Furthermore, where components of a cover assembly formed at operation 712 are to be co-bound with the collection of leaves assembled at operation 714, the method at 722 can include binding the one or more components of the cover assembly with the collection of leaves. As an example, an adhesive can be applied to bind the leaves of the collection with cover portions and/or intermediate components of the cover assembly. At 724, any remaining cover components can be attached to the bound collection. For example, cover portions can be attached to intermediate components of the cover assembly that were co-bound with the collection of leaves as part of operation 722. In at least some examples, at 726, edges of the bound collection of leaves and/or the cover assembly can be trimmed, such as in the case of soft bound books.

As described with reference to FIGS. 3A and 3B, a binding stack height that is equal to, approximately equal to, or less than a text block stack height of a bound collection can be achieved for a bound collection that incorporates a region of reduced cumulative leaf thickness that extends from within an unbound region of the leaves to a binding-side edge of the leaves. This region of reduced cumulative leaf thickness can be provided by leaves that feature binding-side edge tabs and/or leaves that feature a reduced cross section. To achieve certain form factors for a bound collection, it may be desirable to maintain an equal or approximately equal stack height for the binding region and the unbound text block of a bound collection while also incorporating a region of reduced cumulative leaf thickness at least within an unbound region of the leaves to enable improved lay flat and/or wrap around when opened. Thus, in at least some examples, the binding stack height can be selectively increased by increasing a cross section or thickness of individual leaves along the binding-side edge. Example techniques for selectively increasing the cross section or thickness of individual leaves are described in further detail with respect to FIGS. 8A and 8B.

FIG. 8A schematically depicts the use of dimpling 800 along a binding-side edge 810 of a collection of leaves 812 to create protrusions 802 that provide and maintain a spacing 814 between the leaves (e.g., 816 and 818) in a dimension 820 of a binding stack height. Within FIG. 8A, binding side edge 810 can refer to the binding side edge (e.g., 119, 129) of any of the binding-side edge tabs or leaves that feature a reduced cross section, as disclosed herein. As an example, dimpling 800 can be created on a first side 822 of a leaf (e.g., 816) by deforming the leaf along binding side edge 810 that creates protrusions 802 on a second side 824 of the leaf that opposes the first side. Deformation of leaves to create dimpling 800 and resulting protrusions 802 can be achieved by crimping individual leaves, as an example. However, it will be understood that other suitable techniques may be used to create protrusions 802. For example, additive techniques such as molding, material deposition, 3D printing, or bonding of materials can be used to provide protrusions on at least one side of each of a plurality of leaves of a bound collection. Leaves 812 can be bound using any suitable binding technique following the creation of spacing 814 through the use of protrusions 802. For example, an adhesive can be used to bind leaves 812 with spacing 814 at any suitable binding stack height.

FIG. 8B schematically depicts the use of fraying 850 along a binding-side edge 860 of a collection of leaves 862 to provide and maintain a spacing 864 between the leaves (866 and 868) in a dimension 870 of a binding stack height. Within FIG. 8B, binding side edge 860 can refer to the binding side edge (e.g., 119, 129) of any of the binding-side edge tabs or leaves that feature a reduced cross section (e.g., leaf 600), as disclosed herein. Fraying 850 is represented schematically in FIG. 8B by a shading. It will be understood that fraying 850 can create irregular surface texture along binding-side edge 860 of leaves 862 that is not depicted in FIG. 8B. This irregular surface texture can additionally improve binding strength for adhesive bindings due to improved penetration of adhesive along binding side edge 860. Fraying 850 can include swelling of material of the leaves, in at least some examples. Fraying 850 can be created by applying coarse mechanical abrasion and/or chemical solutions to the leaves, as examples. As an example, chemical solutions can be applied at operations 410, 420, and/or 422 of FIG. 4, or at operations 510 and/or 522 of 5A. or other suitable operation of the manufacturing methods described herein. However, it will be understood that other suitable techniques may be used to create fraying 850. For example, additive techniques such as molding, material deposition, 3D printing, or bonding of materials can be used to provide fraying or swelling on each of a plurality of leaves of a bound collection. Leaves 862 can be bound using any suitable binding technique following the creation of spacing 864. For example, an adhesive can be used to bind leaves 862 with spacing 864 at any suitable binding stack height. The forms of edge modification depicted in FIGS. 8A and 8B can be considered as example forms of binding-edge expansion, where the binding edges have expanded binding stack height.

Figure 9:
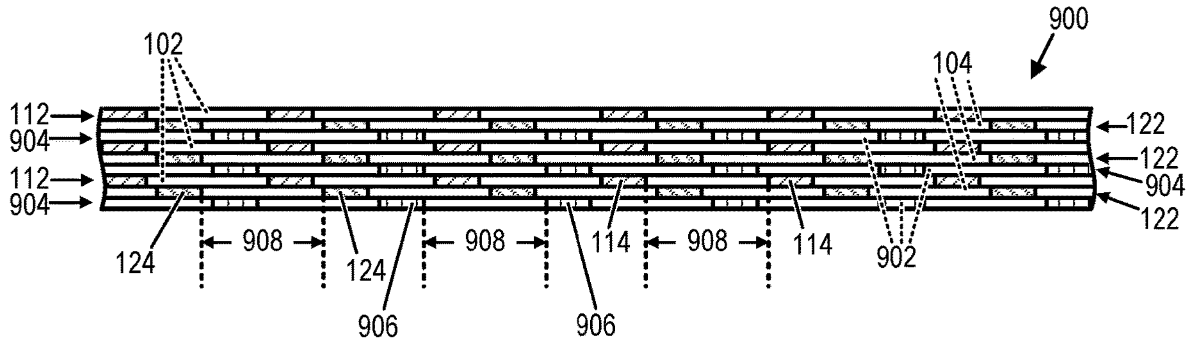
FIG. 9 schematically depicts example bound collection 900 that can refer to another example of the bound collection of FIG. 1A.

FIG. 9 schematically depicts another example bound collection 900 that can refer to an example of previously described bound collection 100 of FIG. 1A. Within FIG. 9, bound collection 900 is viewed along a binding-side edge of leaves (e.g., binding-side edge 119, 129 of FIG. 1) with the hashed sections being the binding-side edges and the non-hashed sections being the intra-leaf gaps. In this example, bound collection 900 includes a first plurality of leaves (e.g., 102) having a first pattern of binding-side edge tabs (e.g., pattern 112 of which tab 114 is an example), a second plurality of leaves (e.g., 104) having a second pattern of binding-side edge tabs (e.g., pattern 122 of which tab 124 is an example), and a third plurality of leaves (e.g., 902 of FIG. 9) having a third pattern of binding-side edge tabs (e.g., pattern 904 of FIG. 9 of which tab 908 is an example). Leaves having tab patterns 112, 122, and 904 are interspersed with each other within the bound collection in this example. Furthermore, in this example, each pattern of tabs can feature an inter-leaf gap height 906 between tabs of that pattern that are sized to have a dimension along the spine axis that is larger than the tabs of the other two patterns of tabs. This approach can be used to provide fully nested, alternating tabs among three or more patterns of tabs. When three patterns of fully nested, alternating tabs are used, the binding stack height can be further reduced from approximately half of the text block stack height (in the case of two patterns of fully nested, alternating tabs) to approximately one-third of the text block stack height.

According to an example of the present disclosure, an article of manufacture, comprises: a bound collection of leaves having a spine; wherein each leaf of a first plurality of leaves of the bound collection includes a first pattern of tabs by which that leaf is bound, the first pattern of tabs being distributed along a binding axis of that leaf that is parallel to a spine axis of the spine; wherein each leaf of a second plurality of leaves of the bound collection includes a second pattern of tabs by which that leaf is bound, the second pattern of tabs being distributed along a binding axis of that leaf that is parallel to the spine axis of the spine; wherein each tab of the first pattern of tabs and the second pattern of tabs extends in a direction orthogonal to the binding axis of its leaf from within an unbound region of that leaf to a binding-side edge of that leaf; wherein the first pattern of tabs differs from the second pattern of tabs along at least a portion of the spine axis. In this example or other examples disclosed herein one or more tabs of the first pattern of tabs are offset from each tab of the second pattern of tabs in a dimension parallel to the spine axis. In this example or other examples disclosed herein, each tab of the first pattern of tabs is spaced apart from one or more neighboring tabs of the first pattern of tabs by a gap length in a dimension parallel to the spine axis; each tab of the second pattern of tabs is spaced apart from one or more neighboring tabs of the second pattern of tabs by a gap length in the dimension parallel to the spine axis; one or more tabs of the second pattern of tabs have a tab length in the dimension parallel to the spine axis that is less than the gap length between two or more neighboring tabs of the first pattern of tabs; and the one or more tabs of the second pattern of tabs having the tab length that is less than the gap length of the first pattern of tabs are aligned within the gap length between the two or more neighboring tabs of the first pattern of tabs along the spine axis. In this example or other examples disclosed herein, the gap length between each neighboring pair of tabs of the first pattern of tabs is constant among the first pattern of tabs; and the gap length between each neighboring pair of tabs of the second pattern of tabs is constant among the second pattern of tabs. In this example or other examples disclosed herein, the gap length between each neighboring pair of tabs of the first pattern of tabs is variable among the first pattern of tabs; and the gap length between each neighboring pair of tabs of the second pattern of tabs is variable among the second pattern of tabs. In this example or other examples disclosed herein, each leaf of the bound collection has a bound order relative to each other leaf of the bound collection within a reference plane that is orthogonal to the spine axis. In this example or other examples disclosed herein, the bound order includes the first plurality of leaves interleaved with the second plurality of leaves. In this example or other examples disclosed herein, the bound order includes a repeating sequence of a subset of the first plurality of leaves followed by a subset of the second plurality of leaves. In this example or other examples disclosed herein, the subset of the first plurality of leaves consists of one leaf of the first plurality of leaves; and the subset of the second plurality of leaves consists of one leaf of the second plurality of leaves. In this example or other examples disclosed herein, the subset of the first plurality of leaves includes two or more leaves of the first plurality of leaves; and the subset of the second plurality of leaves includes two or more leaves of the second plurality of leaves. In this example or other examples disclosed herein, each leaf of a third plurality of leaves of the bound collection includes a third pattern of tabs by which that leaf is bound, the third pattern of tabs being distributed along a binding axis of that leaf that is parallel to the spine axis of the spine; each tab of the third pattern of tabs extends in a direction orthogonal to the binding axis of its leaf from within an unbound region of that leaf to a binding-side edge of that leaf; and the third pattern of tabs differs from both the first pattern of tabs and the second pattern of tabs along at least a portion of the spine axis. In this example or other examples disclosed herein, each leaf of the bound collection has a bound order relative to each other leaf of the bound collection within a reference plane that is orthogonal to the spine axis; and the bound order includes a repeating sequence of a subset of the first plurality of leaves followed by a subset of the second plurality of leaves followed by a subset of the third plurality of leaves. In this example or other examples disclosed herein, each leaf of the first plurality of leaves and the second plurality of leaves is bound within the bound collection by its respective tabs by one or more of an adhesive binding, a sewn binding, a ring binding, spiral binding, a post binding, a clamped binding. In this example or other examples disclosed herein, each leaf of the first plurality of leaves and the second plurality of leaves is bound within the bound collection by its respective tabs along the binding-side edge by an adhesive binding that does not fill a gap between neighboring tabs of that leaf. In this example or other examples disclosed herein, at least some leaves of the bound collection do not include tabs along a binding-side edge of those leaves.

According to another example of the present disclosure, a method of manufacturing a bound collection of leaves having a spine comprises: forming a first plurality of leaves, each leaf of the first plurality of leaves including a first pattern of tabs distributed along a binding axis of that leaf; forming a second plurality of leaves, each leaf of the second plurality of leaves including a second pattern of tabs distributed along a binding axis of that leaf, assembling the first plurality of leaves and the second plurality of leaves to form a collection of leaves such that each binding axis of the first plurality of leaves and the second plurality of leaves is oriented parallel to a spine axis of the spine; and binding the collection of leaves to form the bound collection of leaves by: for each leaf of the first plurality of leaves, binding that leaf within the bound collection by the first pattern of tabs of that leaf, and for each leaf of the second plurality of leaves, binding that leaf within the bound collection by the second pattern of tabs of that leaf; wherein each tab of the first pattern of tabs and the second pattern of tabs within the bound collection of leaves extends in a direction orthogonal to the binding axis of its leaf from within an unbound region of that leaf to a binding-side edge of that leaf; wherein the first pattern of tabs differs from the second pattern of tabs within the bound collection of leaves along at least a portion of the spine axis. In this example or other examples disclosed herein, forming the first plurality of leaves includes: folding leaf material into a first stack of multiple leaf material layers, cutting the first stack to define the first pattern of tabs within each of the multiple leaf material layers of the first stack, and trimming folded edges of the leaf material to separate the first stack into the first plurality of leaves; and wherein forming the second plurality of leaves includes: folding leaf material into a second stack of multiple leaf material layers, cutting the second stack to define the second pattern of tabs within each of the multiple leaf material layers of the second stack, and trimming folded edges of the leaf material to separate the second stack into the second plurality of leaves. In this example or other examples disclosed herein, assembling the first plurality of leaves and the second plurality of leaves to form the collection of leaves includes interleaving the first plurality of leaves with the second plurality of leaves; and wherein the first pattern of tabs of each leaf of the first plurality of leaves and the second pattern of tabs of each leaf of the second plurality of leaves are bound within the bound collection by one or more of an adhesive binding, sewn binding, ring binding, post binding, spiral binding, stapled binding, or clamped binding.

According to another example of the present disclosure, an article of manufacture comprises: a bound collection of leaves having a spine; wherein each leaf of a first plurality of leaves of the bound collection has a reduced cross section that extends from within an unbound region of that leaf to a binding-side edge of that leaf on a dimension (or in a direction) orthogonal to a spine axis of the spine. In this example or other examples disclosed herein, the bound collection of leaves further includes a second plurality of leaves and a third plurality of leaves; wherein each leaf of the second plurality of leaves of the bound collection includes a first pattern of tabs by which that leaf is bound, the first pattern of tabs being distributed along a binding axis of that leaf that is parallel to the spine axis of the spine; wherein each leaf of a third plurality of leaves of the bound collection includes a second pattern of tabs by which that leaf is bound, the second pattern of tabs being distributed along a binding axis of that leaf that is parallel to the spine axis of the spine; wherein each tab of the first pattern of tabs and the second pattern of tabs extends in a direction orthogonal to the binding axis of its leaf from within an unbound region of that leaf to a binding-side edge of that leaf; wherein the first pattern of tabs differs from the second pattern of tabs along at least a portion of the spine axis. In this example or other examples disclosed herein, each leaf of the bound collection having the reduced cross section of the first plurality of leaves is formed from a unitary piece of leaf material. In this example or other examples disclosed herein, each leaf of the plurality of leaves is edge bound within the bound collection along the binding-side edge by an adhesive.

It will be understood that the configurations and/or approaches described herein are exemplary in nature, and that these specific examples are not to be considered in a limiting sense, because numerous variations are possible. The specific methods and operations described herein may represent one or more of any number of manufacturing approaches. As such, various acts illustrated and/or described may be performed in the sequence illustrated and/or described, in other sequences, in parallel, or omitted. Likewise, the order of the above-described operations may be changed.

The subject matter of the present disclosure includes all novel and non-obvious combinations and sub-combinations of the various methods, operations, systems, configurations, and other features, functions, acts, and/or properties disclosed herein, as well as any and all equivalents thereof.

The invention claimed is:

1. An article of manufacture, comprising:

a bound collection of leaves having a spine;

wherein each leaf of a first plurality of leaves of the bound collection includes a first pattern of tabs by which that leaf is bound, the first pattern of tabs being distributed along a binding axis of that leaf that is parallel to a spine axis of the spine;

wherein each leaf of a second plurality of leaves of the bound collection includes a second pattern of tabs by which that leaf is bound, the second pattern of tabs being distributed along a binding axis of that leaf that is parallel to the spine axis of the spine;

wherein each tab of the first pattern of tabs and the second pattern of tabs extends in a direction orthogonal to the binding axis of its leaf from within an unbound region of that leaf to a binding-side edge of that leaf, wherein each tab of the first pattern of tabs and the second pattern of tabs has a bound portion and an unbound portion in a direction orthogonal to the spine axis;

wherein the first pattern of tabs differs from the second pattern of tabs along at least a portion of the spine axis;

wherein each tab of the first pattern of tabs is spaced apart from one or more neighboring tabs of the first pattern of tabs by a gap length in a dimension parallel to the spine axis;

wherein each tab of the second pattern of tabs is spaced apart from one or more neighboring tabs of the second pattern of tabs by a gap length in the dimension parallel to the spine axis;

wherein one or more tabs of the second pattern of tabs have a tab length in the dimension parallel to the spine axis that is less than the gap length between two or more neighboring tabs of the first pattern of tabs; and wherein the one or more tabs of the second pattern of tabs having the tab length that is less than the gap length of the first pattern of tabs are aligned within the gap length between the two or more neighboring tabs of the first pattern of tabs along the spine axis.

2. The article of manufacture of claim 1, wherein one or more tabs of the first pattern of tabs are offset from each tab of the second pattern of tabs in a dimension parallel to the spine axis.

3. The article of manufacture of claim 1, wherein the gap length between each neighboring pair of tabs of the first pattern of tabs is constant among the first pattern of tabs; and wherein the gap length between each neighboring pair of tabs of the second pattern of tabs is constant among the second pattern of tabs.

4. The article of manufacture of claim 1, wherein the bound collection has a bound order of the leaves of the bound collection within a reference plane that is orthogonal to the spine axis.

5. The article of manufacture of claim 4, wherein the bound order includes the first plurality of leaves interleaved with the second plurality of leaves.

6. The article of manufacture of claim 4, wherein the bound order includes a repeating sequence of a subset of the first plurality of leaves followed by a subset of the second plurality of leaves.

7. The article of manufacture of claim 6, wherein the subset of the first plurality of leaves consists of one leaf of the first plurality of leaves; and wherein the subset of the second plurality of leaves consists of one leaf of the second plurality of leaves.

8. The article of manufacture of claim 6, wherein the subset of the first plurality of leaves includes two or more leaves of the first plurality of leaves; and wherein the subset of the second plurality of leaves includes two or more leaves of the second plurality of leaves.

9. The article of manufacture of claim 1, wherein each leaf of a third plurality of leaves of the bound collection includes a third pattern of tabs by which that leaf is bound, the third pattern of tabs being distributed along a binding axis of that leaf that is parallel to the spine axis of the spine;

wherein each tab of the third pattern of tabs extends in a direction orthogonal to the binding axis of its leaf from within an unbound region of that leaf to a binding-side edge of that leaf;

wherein the third pattern of tabs differs from both the first pattern of tabs and the second pattern of tabs along at least a portion of the spine axis.

10. The article of manufacture of claim 9, wherein the bound collection has a bound order of the leaves of the bound collection; and wherein the bound order includes a repeating sequence of a subset of the first plurality of leaves followed by a subset of the second plurality of leaves followed by a subset of the third plurality of leaves.

11. The article of manufacture of claim 1, wherein each leaf of the first plurality of leaves and the second plurality of leaves is bound within the bound collection by its respective tabs by one or more of an adhesive binding, a sewn binding, a ring binding, spiral binding, a post binding, a stapled binding, or a clamped binding.

12. The article of manufacture of claim 1, wherein each leaf of the first plurality of leaves and the second plurality of leaves is bound within the bound collection by its respective tabs along the binding-side edge by an adhesive binding that does not fill a gap between neighboring tabs of that leaf.

13. The article of manufacture of claim 1, wherein at least some leaves of the bound collection do not include tabs along a binding-side edge of those leaves.

14. A method of manufacturing a bound collection of leaves having a spine, the method comprising:

forming a first plurality of leaves, each leaf of the first plurality of leaves including a first pattern of tabs distributed along a binding axis of that leaf;

forming a second plurality of leaves, each leaf of the second plurality of leaves including a second pattern of tabs distributed along a binding axis of that leaf;

assembling the first plurality of leaves and the second plurality of leaves to form a collection of leaves such that each binding axis of the first plurality of leaves and the second plurality of leaves is oriented parallel to a spine axis of the spine that is formed upon binding the collection of leaves; and binding the collection of leaves to form the bound collection of leaves having the spine by:

for each leaf of the first plurality of leaves, binding that leaf within the bound collection by the first pattern of tabs of that leaf, and for each leaf of the second plurality of leaves, binding that leaf within the bound collection by the second pattern of tabs of that leaf;

wherein each tab of the first pattern of tabs and the second pattern of tabs within the bound collection of leaves extends in a direction orthogonal to the binding axis of its leaf from within an unbound region of that leaf to a binding-side edge of that leaf, wherein each tab of the first pattern of tabs and the second pattern of tabs has a bound portion and an unbound portion in a direction orthogonal to the spine axis;

wherein the first pattern of tabs differs from the second pattern of tabs within the bound collection of leaves along at least a portion of the spine axis;

wherein each tab of the first pattern of tabs is spaced apart from one or more neighboring tabs of the first pattern of tabs by a gap length in a dimension parallel to the spine axis;

wherein each tab of the second pattern of tabs is spaced apart from one or more neighboring tabs of the second pattern of tabs by a gap length in the dimension parallel to the spine axis;

wherein one or more tabs of the second pattern of tabs have a tab length in the dimension parallel to the spine axis that is less than the gap length between two or more neighboring tabs of the first pattern of tabs; and wherein the one or more tabs of the second pattern of tabs having the tab length that is less than the gap length of the first pattern of tabs are aligned within the gap length between the two or more neighboring tabs of the first pattern of tabs along the spine axis.

15. The method of claim 14, wherein forming the first plurality of leaves includes:

folding leaf material into a first stack of multiple leaf material layers, cutting the first stack to define the first pattern of tabs within each of the multiple leaf material layers of the first stack, and trimming folded edges of the leaf material to separate the first stack into the first plurality of leaves; and wherein forming the second plurality of leaves includes:

folding leaf material into a second stack of multiple leaf material layers, cutting the second stack to define the second pattern of tabs within each of the multiple leaf material layers of the second stack, and trimming folded edges of the leaf material to separate the second stack into the second plurality of leaves.

16. The method of claim 14, assembling the first plurality of leaves and the second plurality of leaves to form the collection of leaves includes interleaving the first plurality of leaves with the second plurality of leaves; and wherein the first pattern of tabs of each leaf of the first plurality of leaves and the second pattern of tabs of each leaf of the second plurality of leaves are bound within the bound collection by one or more of an adhesive binding, sewn binding, ring binding, spiral binding, post binding, stapled binding, or clamped binding.

* * * * *